US008261968B2

(12) United States Patent
Uesaka et al.

(10) Patent No.: US 8,261,968 B2
(45) Date of Patent: Sep. 11, 2012

(54) PAPER SHEET HANDLING SYSTEM, METHOD OF USE THEREOF, AND METHOD OF USE OF BAR-CODE TICKET HANDLING MACHINE

(75) Inventors: Sadaaki Uesaka, Hyogo-Ken (JP); Hiroya Mouri, Kobe (JP); John Prather, Las Vegas, NV (US); Sadatoshi Kusatani, Himeji (JP)

(73) Assignee: Glory Ltd., Himeji-Shi (JP)

( * ) Notice: Subject to any disclaimer, the term of this patent is extended or adjusted under 35 U.S.C. 154(b) by 868 days.

(21) Appl. No.: 12/099,923

(22) Filed: Apr. 9, 2008

(65) Prior Publication Data

US 2009/0255984 A1 Oct. 15, 2009

(51) Int. Cl.
*G06F 17/00* (2006.01)

(52) U.S. Cl. ........................................ 235/375; 235/379

(58) Field of Classification Search .................. 235/375, 235/379, 383, 385, 462.01, 462.1
See application file for complete search history.

(56) References Cited

U.S. PATENT DOCUMENTS 3,612,835 A * 10/1971 Andrews et al. .............. 235/440
6,068,194 A * 5/2000 Mazur ........................... 235/492
6,110,044 A * 8/2000 Stern .............................. 463/29
6,748,101 B1 * 6/2004 Jones et al. ................... 382/135
7,146,245 B2 * 12/2006 Jones et al. ................... 700/224

* cited by examiner

*Primary Examiner* — Daniel StCyr
(74) *Attorney, Agent, or Firm* — Burr & Brown

(57) ABSTRACT

A method of use of a paper-sheet handling system including the steps of: preparing a paper-sheet handling system configured to handle a bundle of paper-sheets including banknotes and bar-code tickets, the paper-sheet handling system including, a banknote handling machine configured to take in the paper-sheets from the exterior, one sheet at a time, discriminate the banknotes from the paper-sheets taken therein, and reject the paper-sheets when the paper-sheets other than the banknotes are taken therein, a bar-code ticket handling machine configured to take in paper-sheets from the exterior, one sheet at a time, read the bar-code information of each bar-code ticket included in the paper-sheets taken therein while obtaining an image of the bar-code ticket, and reject the paper-sheets when the paper-sheets other than the bar-code tickets are taken therein, and a host controller being communicatively connected both with the banknote handling machine and with the bar-code ticket handling machine.

23 Claims, 11 Drawing Sheets

PAPER SHEET HANDLING SYSTEM, METHOD OF USE THEREOF, AND METHOD OF USE OF BAR-CODE TICKET HANDLING MACHINE

FIELD OF THE INVENTION

The present invention relates to a paper-sheet handling system and a method of use thereof for handling a bundle of paper-sheets including banknotes and bar-code tickets, and also relates a method of use of bar-code ticket handling machine for handling a bundle of bank-notes including bar-code tickets.

BACKGROUND OF THE INVENTION

As a method of paying prize money from an amusement machine, such as a slot machine, in a casino, there is a method of paying bar-code tickets each provided with bar-code information (e.g., a bar-code corresponding to a certain eighteen-digit number), other than a method of directly paying banknotes. In the method in which the amusement machine pays the bar-code tickets as the prize money, the bar-code information concerning each bar-code ticket and an amount of money corresponding to each bar-code ticket are stored in a casino host controller installed in the casino.

When a patron wants to change the bar-code tickets paid from the amusement machine into cash, the patron hands the bar-code tickets to a cashier of the casino, and the cashier reads the bar-code information of each bar-code ticket by using a handy scanner or the like and transmits the bar-code information to the casino host controller. As a result, information related to the amount of money corresponding to the bar-code information is communicated to the cashier of the casino from the casino host controller, and the cashier will hand banknotes and coins to the patron, corresponding to the amount of money.

Otherwise, an automatic cashing machine is installed in the casino, and the patron inserts each bar-code ticket in the automatic cashing machine, so that the bar-code information of each bar-code ticket can be read automatically in the automatic cashing machine. The so-read bar-code information is transmitted to the casino host controller, and the information concerning the amount of money corresponding to the bar-code information is then sent back to the automatic cashing machine from the casino host controller. As a result, banknotes and coins corresponding to the amount of money may be automatically paid to the patron from the automatic cashing machine.

The patron can also use the bar-code tickets obtained from one amusement machine in another amusement machine. In this case, the patron can play a game with another amusement machine by inserting each bar-code ticket in the amusement machine, rather than using banknotes for the amusement machine.

In the method in which the amusement machine pays the bar-code tickets as the prize money as described above, the bar-code tickets must be kept for a period of time in the casino according to the rules. As a method of keeping the bar-code tickets, there are a method of keeping the bar-codes tickets themselves and another method of keeping images of the respective bar-codes tickets after obtaining the images of the bar-code tickets. Then, because of time and labor required for handling a great amount of the bar-code tickets and a space for the custody thereof in the casino, the latter method is currently popular.

More specifically, for example, in a cassette installed in each amusement machine, such as a slot machine, the banknotes and bar-code tickets deposited by each patron are stored in a mixed state. This cassette is detachable from the amusement machine. Thus, when collecting the banknotes and bar-code tickets from each amusement machine, an operator or operators remove the cassettes from the respective amusement machines and collect the banknotes and bar-code tickets in a mixed state from each cassette in a place where the patrons can not enter. Thereafter, among a bundle of the banknotes and bar-code tickets collected in a mixed state, discrimination of denominations of money, counterfeit ones or not and damaged ones or not is performed, for the banknotes. On the other hand, for the bar-code tickets, the bar-code information is read and the images of the respective bar-code tickets are obtained.

As a machine for handling such a bundle of banknotes and/or bar-code tickets collected in a mixed state, for example, one described in U.S. Pat. No. 7,040,476 is known. Specifically, U.S. Pat. No. 7,040,476 discloses a single machine, which classifies the bundle of banknotes and bar-code tickets in a mixed state into the banknotes and the bar-code tickets respectively, accumulates the banknotes and the bar-code tickets separately, and performs discrimination of the denominations of money, counterfeit ones or not and damaged ones or not, for the banknotes. Meanwhile, for the bar-code tickets, this machine is configured to read the bar-code information.

However, in the machine disclosed in U.S. Pat. No. 7,040,476, after the discrimination of the banknotes and the reading of the bar-code information concerning the bar-code tickets, there is a need for taking out a bundle of the bar-code tickets from the machine so as to obtain the images of the bar-code tickets by using another machine, such as an image scanner. Therefore, the operator must do a significantly complicated work. In addition, the images taken from the additional machine, such as an image scanner, can not be associated with the identification data information of each amusement machine, such as a slot machine or the like.

It is also known a paper-sheets handling system that has the apparatus which handles (e.g. counts) the banknotes and the apparatus which reads the bar-code information of the bar-code tickets independently, the banknotes and the bar-code tickets are handled by the corresponding apparatus separately. In such a paper-sheets handling system by using two independent apparatus which handle separately, however, the handling results according to each apparatus are output separately, then it is impossible to comprehend the total handling.

As another example of the machine for handling the bundle of banknotes and bar-code tickets collected in a mixed state, for example, one described in U.S. Pat. No. 7,201,320 is known. U.S. Pat. No. 7,201,320 discloses a single machine which reads the bar-code information of bar-code tickets taken therein and forms the image file from the bar-code information. In such an integrated machine, however, it is not efficient since when the number of sheets of only either one of the banknotes or bar-code tickets is considerably large, it is necessary to increase the integrated machine which can handle both banknotes and bar-code tickets.

It is an object of this invention to provide a paper-sheet handling system and a method of use thereof, which can efficiently handle a bundle of banknotes and bar-code tickets collected in a mixed state, which can be comprehended with both handling operations at one area, and significantly reduce the initial cost if only either one of the banknote handling machine or bar-code ticket handling machine has to be increased when the number of sheets of only either one of the banknotes or bar-code tickets to be handled is considerably large.

It is another object of the present invention to provide a paper-sheet handling system and a method of use thereof, which can reduce handling time by separately handling the banknotes and the bar-code tickets by respectively using the banknote handling machine and the bar-code ticket handling machine when the bundle of paper-sheets to be handled are carried in with the banknotes and the bar-code tickets being respectively classified, rather than being in a mixed state. It is still another object of the present invention to provide a method of use of a bar-code ticket handling machine, wherein a plurality of bundles of paper-sheets can be collectively handled by using the bar-code ticket handling machine, with the plurality of bundles of paper-sheets being stacked one on another, as such securely reducing the handling time due to the bar-code ticket handling machine.

SUMMARY OF THE INVENTION

A method of use of a paper-sheet handling system of the present invention comprises the steps of: preparing a paper-sheet handling system configured to handle a bundle of paper-sheets including banknotes and bar-code tickets, the paper-sheet handling system including a banknote handling machine configured to take in the paper-sheets from the exterior, one sheet at a time, discriminate the banknotes included in the paper-sheets taken therein, and reject the paper-sheets when paper-sheets other than the banknotes are taken therein, a bar-code ticket handling machine configured to taken in the paper-sheets from the exterior, one sheet at a time, read bar-code information of each bar-code ticket included in the paper-sheets taken therein while obtaining an image of the bar-code ticket, and reject the paper-sheets when paper-sheets other than the bar-code tickets are taken therein, and a host controller being communicatively connected both with the banknote handling machine and with the bar-code ticket handling machine, information concerning the discrimination result of the banknotes being sent from the banknote handling machine to the host controller as well as the bar-code information read from each bar-code ticket being sent from the bar-code ticket handling machine to the host controller; preparing the bundle including the banknotes and the bar-code tickets; and first having either one handling machine of the banknote handling machine or bar-code ticket handling machine handle the prepared bundle of paper-sheets, and then having the other handling machine handle the paper-sheets that are rejected by the first used handling machine.

According to this method of use of the paper-sheet handling system, the bundle of paper-sheets including at least one of the banknotes and the bar-code tickets can be first handled by either one handling machine of the banknote handling machine or bar-code ticket handling machine, and the paper-sheets that are rejected by the one handling machine can then be handled by the other handling machine. In such a manner, the paper-sheet handling system is composed of the banknote handling machine adapted to discriminate the denominations of banknotes, counterfeit ones or not, damaged ones or not, and the like, and the bar-code ticket handling machine adapted to read the bar-code information of each bar-code ticket and obtain the image of the bar-code ticket, while these handling machines are separately provided to the system. Therefore, the bundle of paper-sheets including the banknotes and the bar-code tickets in a mixed state can be handled more efficiently. Furthermore, since the banknote handling machine and the bar-code ticket handling machine are separately provided to the system, when the number of sheets of only either one of the banknotes or bar-code tickets to be handled is significantly greater, the number of only either one of the banknote handling machine or bar-code ticket handling machine should be increased. As such, the initial cost can be significantly reduced. Furthermore, since the host controller is communicatively connected both with the banknote handling machine and with the bar-code ticket handling machine, information concerning the discrimination result of the banknotes can be sent from the banknote handling machine to the host controller as well as the bar-code information read from each bar-code ticket can be sent from the bar-code ticket handling machine to the host controller.

In the method of use of the paper-sheet handling system of this invention, it is preferred that the method further comprises the steps of: sending the information concerning the discrimination result of the banknotes from the banknote handling machine to the host controller, and sending the bar-code information read from each bar-code ticket from the bar-code ticket handling machine to the host controller, and calculating the total amount of both the amount of the banknotes taken in the banknote handling machine and the amount corresponding the bar-code tickets taken in the bar-code ticket handling machine by the host controller, based on the information concerning the discrimination result of the banknotes sent from the banknote handling machine and the bar-code information read from each bar-code ticket sent from the bar-code ticket handling machine.

In the method of use of the paper-sheet handling system of this invention, it is preferred that upon preparing the bundle of paper-sheets including the banknotes and the bar-code tickets, the bundle of paper-sheets are collected from the exterior of the paper-sheet handling system, and a medium provided with identification data information is added to the bundle of paper-sheets when the bundle of paper-sheets are collected from the exterior, wherein before the bundle of paper-sheets are handled by the bar-code ticket handling machine, the identification data information of the medium added to the bundle of paper-sheets is read, and the bar-code information of each bar-code ticket read by the bar-code ticket handling machine and information concerning the image obtained by the bar-code ticket handling machine are associated with the identification data information of the medium.

In this case, it is particularly preferred that before the bundle of paper-sheets are handled by the banknote handling machine, the identification data information of the medium added to the bundle of paper-sheets is read, and discrimination information concerning the banknotes discriminated by the banknote handling machine and the identification data information of the medium are associated with each other.

In the method of use of the paper-sheet handling system of this invention, it is preferred that upon preparing the bundle of paper-sheets including the banknotes and the bar-code tickets, the bundle of paper-sheets are collected from the exterior of the paper-sheet handling system, and a medium provided with identification data information is added to the bundle of paper-sheets when the bundle of paper-sheets are collected from the exterior, the bar-code ticket handling machine is configured to read the identification data information of the medium, and the bar-code information of each bar-code ticket read by the bar-code ticket handling machine and the information concerning the image obtained by the bar-code ticket handling machine are associated with the identification data information of the medium read by the bar-code ticket handling machine. It is also preferred that before the bundle of paper-sheets added with the medium provided with the identification data information are carried to the bar-code ticket handling machine, a plurality of bundles of paper-sheets, each added with the medium, are stacked one on another, such that the plurality of bundles of paper-sheets are collectively handled by the bar-code ticket handling machine, and the bar-code ticket handling machine is configured to read the identification data information of each medium when the medium is carried thereto as well as to reject the medium.

It is also preferred that both the banknote handling machine and the bar-code ticket handling machine are configured to read the identification data information of the medium and to reject the medium, and the discrimination information concerning the banknotes discriminated by the banknote handling machine is associated with the identification data information of the medium read by the banknote handling machine.

In the method of use of the paper-sheet handling system of this invention, it is preferred that the bar-code ticket handling machine can handle five hundred or more sheets of bar-code tickets per minute, more preferably six hundred or more sheets of bar-code tickets per minute.

A method of use of a paper-sheet handling system of the present invention comprises the steps of: preparing a paper-sheet handling system configured to handle a bundle of paper-sheets including banknotes and bar-code tickets, the paper-sheet handling system including a banknote handling machine configured to take in the paper-sheets from the exterior, one sheet at a time, discriminate the banknotes included in the paper-sheets taken therein, and reject the paper-sheets when the paper-sheets other than the banknotes are taken therein, a bar-code ticket handling machine configured to take in the paper-sheets from the exterior, one sheet at a time, read the bar-code information of each bar-code ticket included in the paper-sheets taken therein while obtaining an image of the bar-code ticket, and reject the paper-sheets when paper-sheets other than the bar-code tickets are taken therein, and a host controller being communicatively connected both with the banknote handling machine and with the bar-code ticket handling machine, information concerning the discrimination result of the banknotes being sent from the banknote handling machine to the host controller as well as the bar-code information read from each bar-code ticket being sent from the bar-code ticket handling machine to the host controller; classifying the banknotes and the bar-code tickets in advance and preparing the respective bundles separately; and having the banknote handling machine handle the prepared bundle of the banknotes while having the bar-code ticket handling machine handle the prepared bundle of the bar-code tickets.

According to this method of use of the paper-sheet handling system, the banknotes and the bar-code tickets are classified in advance and the respective bundles are prepared separately, and the prepared bundle of the banknotes are handled by the banknote handling machine while the prepared bundle of the bar-code tickets are handled by the bar-code ticket handling machine. In this case, as compared with the case of handling the separately prepared bundles of the banknotes and bar-code tickets, by using a single machine provided with all of the functions, i.e., the function for discriminating the banknotes, the function for reading of the bar-code of each bar-code ticket and that for obtaining the image of the bar-code ticket, the time required for handling the paper-sheets can be significantly reduced. Furthermore, since the host controller is communicatively connected both with the banknote handling machine and with the bar-code ticket handling machine, information concerning the discrimination result of the banknotes can be sent from the banknote handling machine to the host controller as well as the bar-code information read from each bar-code ticket can be sent from the bar-code ticket handling machine to the host controller.

In the method of use of the paper-sheet handling system of this invention, it is preferred that the method further comprises the steps of: sending the information concerning the discrimination result of the banknotes from the banknote handling machine to the host controller, and sending the bar-code information read from each bar-code ticket from the bar-code ticket handling machine to the host controller, and calculating the total amount of both the amount of the banknotes taken in the banknote handling machine and the amount corresponding the bar-code tickets taken in the bar-code ticket handling machine by the host controller, based on the information concerning the discrimination result of the banknotes sent from the banknote handling machine and the bar-code information read from each bar-code ticket sent from the bar-code ticket handling machine.

In the method of use of the paper-sheet handling system of this invention, it is preferred that the handling of the banknotes due to the banknote handling machine and the handling of bar-code tickets due to the bar-code ticket handling machine are performed in parallel with each other.

A method of use of a bar-code ticket handling machine of the present invention is the method of use of a bar-code ticket handling machine for use in handling a bundle of paper-sheets including bar-code tickets, the bar-code ticket handling machine being configured to take in the paper-sheets from the exterior, one sheet at a time, read the bar-code information of each bar-code ticket included in the paper-sheets taken therein while obtaining an image of the bar-code ticket, the method comprising the steps of: collecting the bundle of paper-sheets including the bar-code tickets from the exterior of the bar-code ticket handling machine; adding a medium provided with identification data information to the bundle of paper-sheets when the bundle of paper-sheets are collected from the exterior of the bar-code ticket handling machine; stacking a plurality of bundles with the medium provided with the identification data collectively, on the bar-code ticket handling machine; having the bar-code ticket handling machine process the plurality of paper-sheets collectively, and during the handling, having the bar-code ticket handling machine read the identification data information of each medium included in each bundle of paper-sheets; associating the bar-code information of each bar-code ticket read by the bar-code ticket handling machine and information concerning the image obtained by the bar-code ticket handling machine with the identification data information of the medium read by the bar-code ticket handling machine; and rejecting the medium which has been read, and also rejecting the paper-sheets, for which the bar-code information could not be read.

According to this method of use of the bar-code ticket handling machine, the plurality of bundles of paper-sheets can be collectively handled by the bar-code ticket handling machine while the bundles are stacked one on another. The handling time due to the bar-code ticket handling machine can be significantly reduced. In addition, the identification data information of each amusement machine, register or the like (or identification data information of each cassette detachably attached to the amusement machine or the like) can be associated with at least one of the bar-code information of each bar-code ticket corresponding to the amusement machine, register or the like and the image obtained from the bar-code ticket. Furthermore, since the host controller is communicatively connected both with the banknote handling machine and with the bar-code ticket handling machine, information concerning the discrimination result of the banknotes can be sent from the banknote handling machine to the host controller as well as the bar-code information read from each bar-code ticket can be sent from the bar-code ticket handling machine to the host controller.

In the method of use of the bar-code ticket handling machine of this invention, it is preferred that it is preferred that the method further comprises the steps of having the bar-code ticket handling machine handle the plurality of the bundles of paper-sheets, each bundles having the medium, the plurality of the bundles of paper-sheets being rejected from the bar-code ticket handling machine.

A paper-sheet handling system of the present invention is the paper-sheet handling system for use in handling a bundle of paper-sheets including banknotes and bar-code tickets, the paper-sheet handling system comprising: a banknote handling machine configured to take in the paper-sheets from the exterior, one sheet at a time, discriminate the banknotes included in paper-sheets taken therein, and reject the paper-sheets when the paper-sheets other than the banknotes are taken therein; a bar-code ticket handling machine configured to take in the paper-sheets from the exterior, one sheet at a time, read the bar-code information of each bar-code ticket included in the paper-sheets taken therein while obtaining an image of the bar-code ticket, and reject the paper-sheets when the paper-sheets other than bar-code tickets are taken therein; and a host controller, which is communicatively connected both with the banknote handling machine and with the bar-code ticket handling machine, and to which information concerning the discrimination result of the banknotes is sent from the banknote handling machine as well as to which the bar-code information read from each bar-code ticket is sent from the bar-code ticket handling machine.

According to this paper-sheet handling system, upon handling the bundle including the banknotes and the bar-code tickets by using the paper-sheet handling system, the bundle of paper-sheets can be first handled by either one handling machine of the banknote handling machine or bar-code ticket handling machine, and the paper-sheets that are rejected by the one handling machine can then be handled by the other handling machine. In such a manner, the paper-sheet handling system is composed of the banknote handling machine adapted for discriminating the denominations of banknotes, counterfeit ones or not, damaged ones or not, and the like, and the bar-code ticket handling machine adapted for reading the bar-code information of each bar-code ticket and obtaining the image of the bar-code ticket, while these handling machines are separately provided to the system. Therefore, the bundle of paper-sheets including the banknotes and the bar-code tickets in a mixed state can be handled more efficiently. Furthermore, since the banknote handling machine and the bar-code ticket handling machine are separately provided, when the number of sheets of only either one of the banknotes or bar-code tickets to be handled is significantly greater, the number of only either one of the banknote handling machine or bar-code ticket handling machine should be increased. As such, the initial cost can be securely reduced.

In the paper-sheet handling system of this invention, it is preferred that the host controller is configured to calculate the total amount of both the amount of the banknotes taken in the banknote handling machine and the amount corresponding the bar-code tickets taken in the bar-code ticket handling machine, based on the information concerning the discrimination result of the banknotes sent from the banknote handling machine and the bar-code information read from each bar-code ticket sent from the bar-code ticket handling machine.

In the paper-sheet handling system of this invention, it is preferred that the paper-sheet handling system further comprises an image process terminal, which is communicatively connected with the bar-code ticket handling machine, and to which the information concerning the image obtained from the bar-code ticket is sent from the bar-code ticket handling machine.

In the paper-sheet handling system of this invention, it is preferred that the number of the banknote handling machines is one or more and the number of the bar-code ticket handling machines is one or more, and wherein the respective banknote handling machines and the respective bar-code ticket handling machines are communicatively connected with the host controller, respectively, such that the number of banknote handling machines or the number of bar-code ticket handling machines can be changed, respectively.

In the paper-sheet handling system of this invention, it is preferred that the bundle of paper-sheets including the banknotes and the bar-code tickets are collected from the exterior of the paper-sheet handling system, and a medium provided with identification data information is added to the bundle of paper-sheets when the bundle of paper-sheets are collected from the exterior, the paper-sheet handling system further comprises a media information reader configured to read the identification data information of the medium added to the bundle of paper-sheets, and at least one of the bar-code information of each bar-code ticket read by the bar-code ticket handling machine and information concerning the image obtained by the bar-code ticket handling machine are associated with the identification data information of the medium read by the media information reader before the bundle of paper-sheets are handled by the bar-code ticket handling machine. It is also preferred that the discrimination information concerning the banknotes discriminated by the banknote handling machine and the identification data information of the medium read by the media information reader before the bundle of paper-sheets are handled by the banknote handling machine are associated with each other.

Alternatively, it is preferred that the bundle of paper-sheets including the banknotes and the bar-code tickets are collected from the exterior of the paper-sheet handling system, and a medium provided with identification data information is added to the bundle of paper-sheets when the bundle of paper-sheets are collected from the exterior, the bar-code ticket handling machine is configured to read the identification data information of the medium, and the bar-code information of each bar-code ticket read by the bar-code ticket handling machine and information concerning the image to be obtained by the bar-code ticket handling machine are associated with the identification data information of the medium obtained by the bar-code ticket handling machine.

It is further preferred that before the bundle of paper-sheets added with the medium provided with the identification data information are carried to the bar-code ticket handling machine, a plurality of bundles of paper-sheets, each added with the medium, are stacked one on another, such that the plurality of bundles of paper-sheets are collectively handled by the bar-code ticket handling machine, and wherein the bar-code ticket handling machine is configured to read the identification data information of each medium when the medium is carried thereto as well as to reject the medium.

It is further preferred that both the banknote handling machine and the bar-code ticket handling machine are configured to read the identification data information of the medium and to reject the medium, and the discrimination information concerning the banknotes discriminated by the banknote handling machine is associated with the identification data information of the medium read by the banknote handling machine.

In the paper-sheet handling system of this invention, it is preferred that the bar-code ticket handling machine can handle five hundred or more sheets of bar-code tickets per minute, more preferably six hundred or more sheets of bar-code tickets per minute.

DETAILED DESCRIPTION OF THE INVENTION

Hereinafter, one embodiment of the present invention will be described with reference to the drawings. FIGS. 1 to 7 are provided to illustrate one embodiment of the paper-sheet handling system according to the present invention. The paper-sheet handling system of this embodiment is used for handling a bundle of paper-sheets including banknotes or bar-code tickets collected from each amusement machine, such as a slot machine, in a casino.

Figure 1:
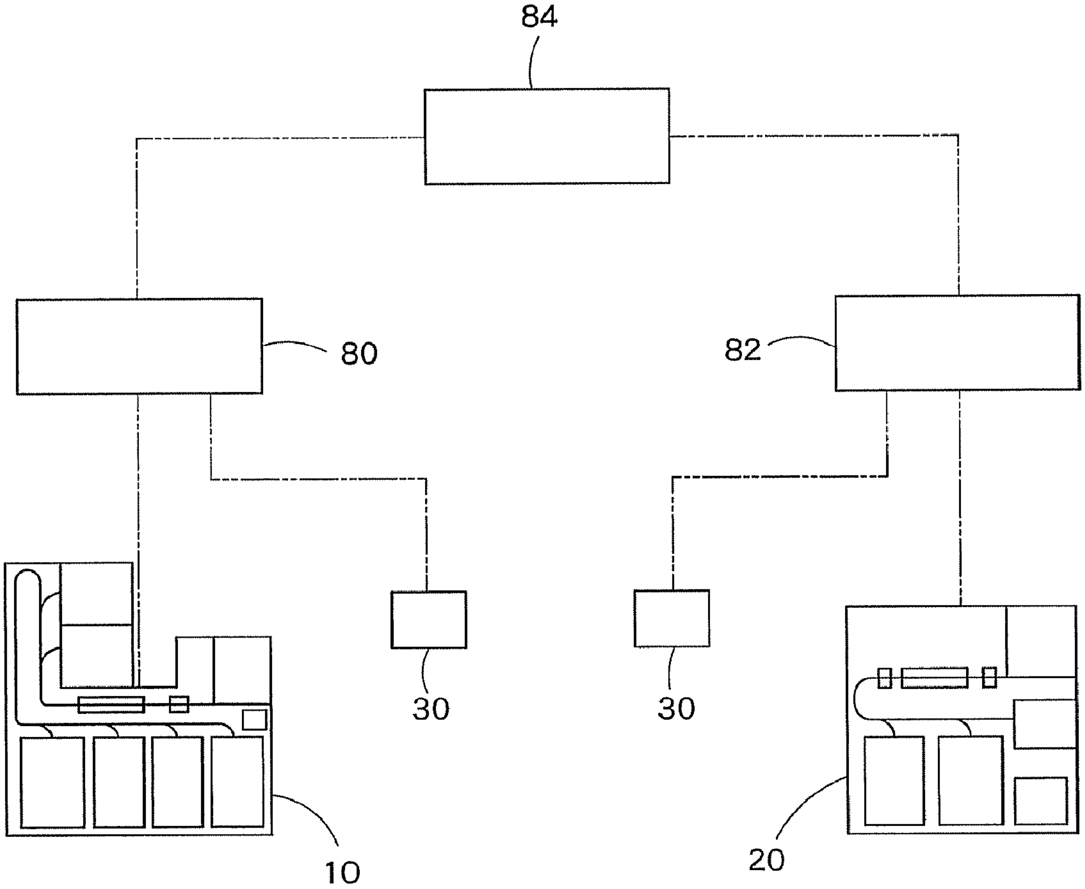
FIG. 1 is a schematic view showing a general construction of the paper-sheet handling system of one embodiment according to the present invention.
Figure 2:
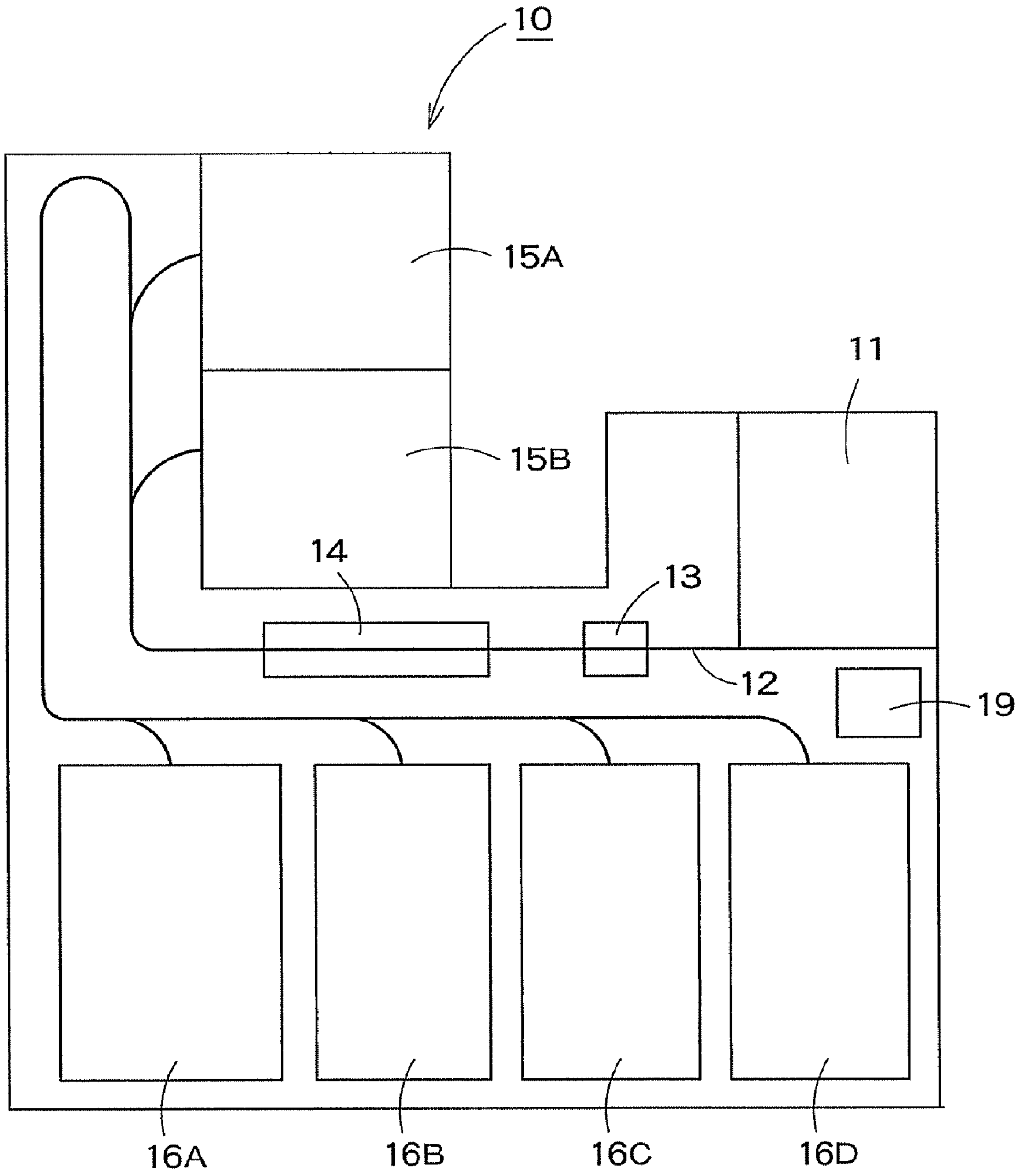
FIG. 2 is a schematic view showing a general construction of a banknote handling machine in the paper-sheet handling system in FIG. 1.
Figure 3:
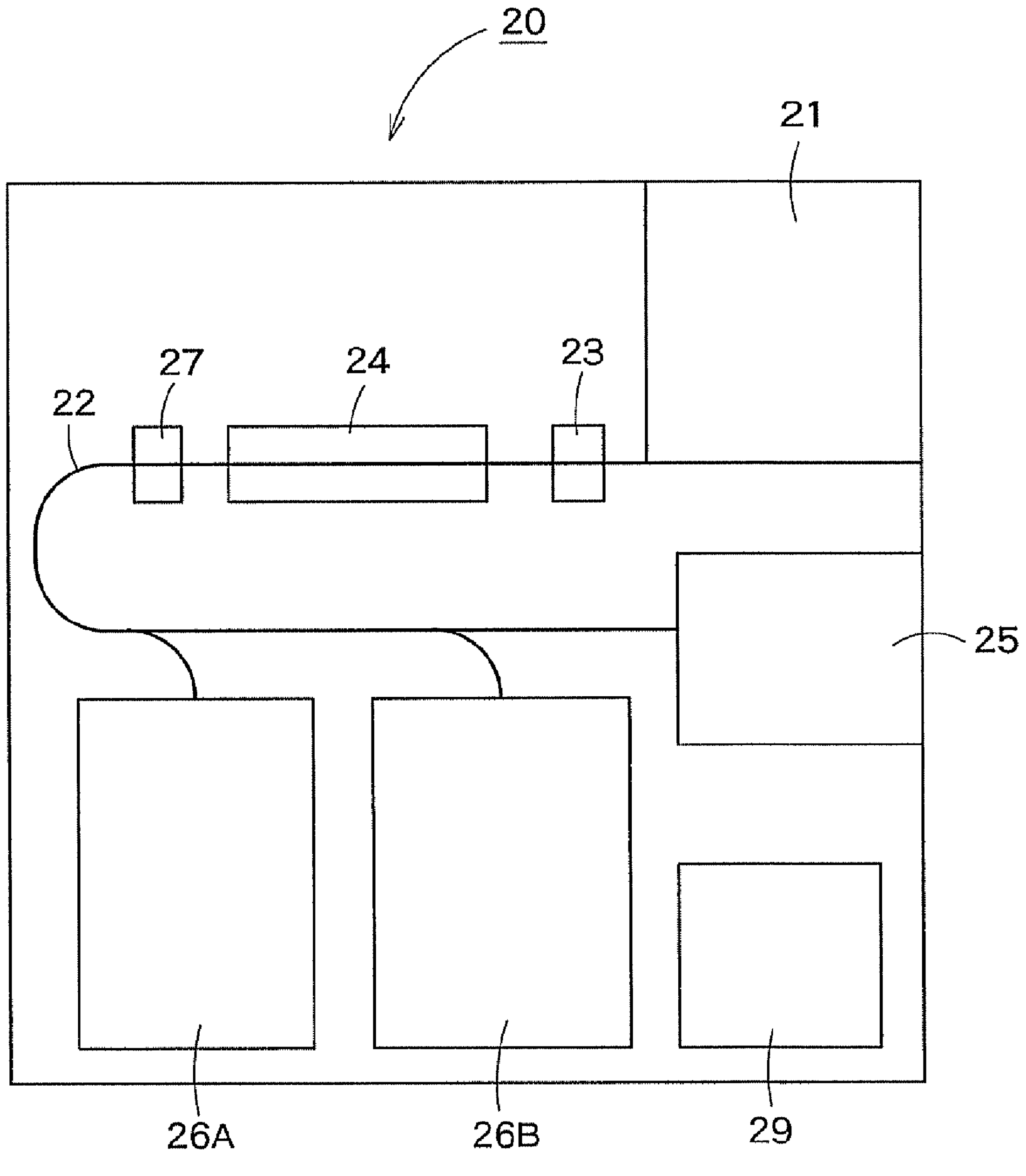
FIG. 3 is a schematic view showing a general construction of a bar-code ticket handling machine in the paper-sheet handling system in FIG. 1.
Figure 4:
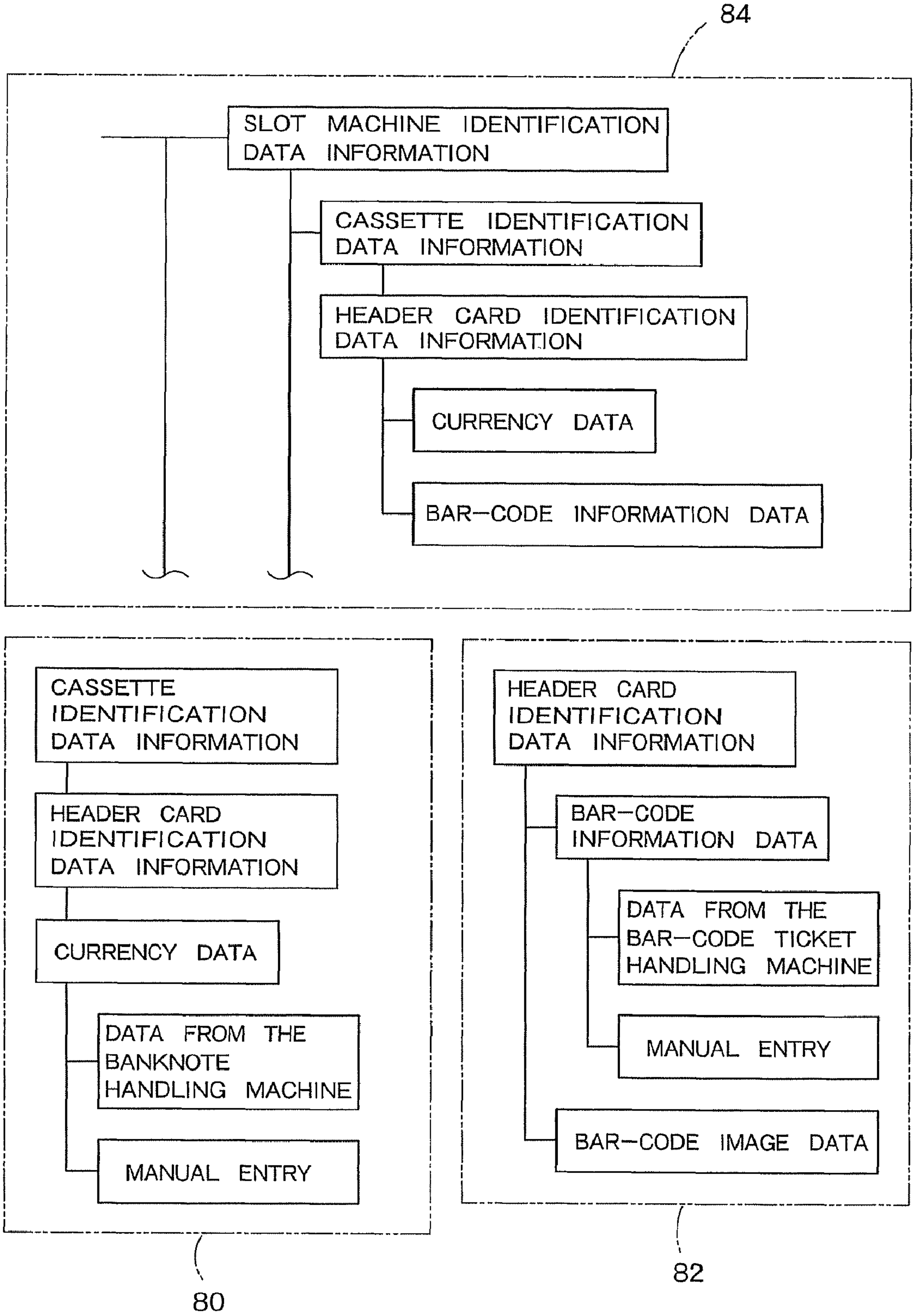
FIG. 4 is a block diagram for illustrating association of identification data information, in a casino host controller, a casino settling terminal and an image process terminal, respectively, in the paper-sheet handling system in FIG. 1.
Figure 5:
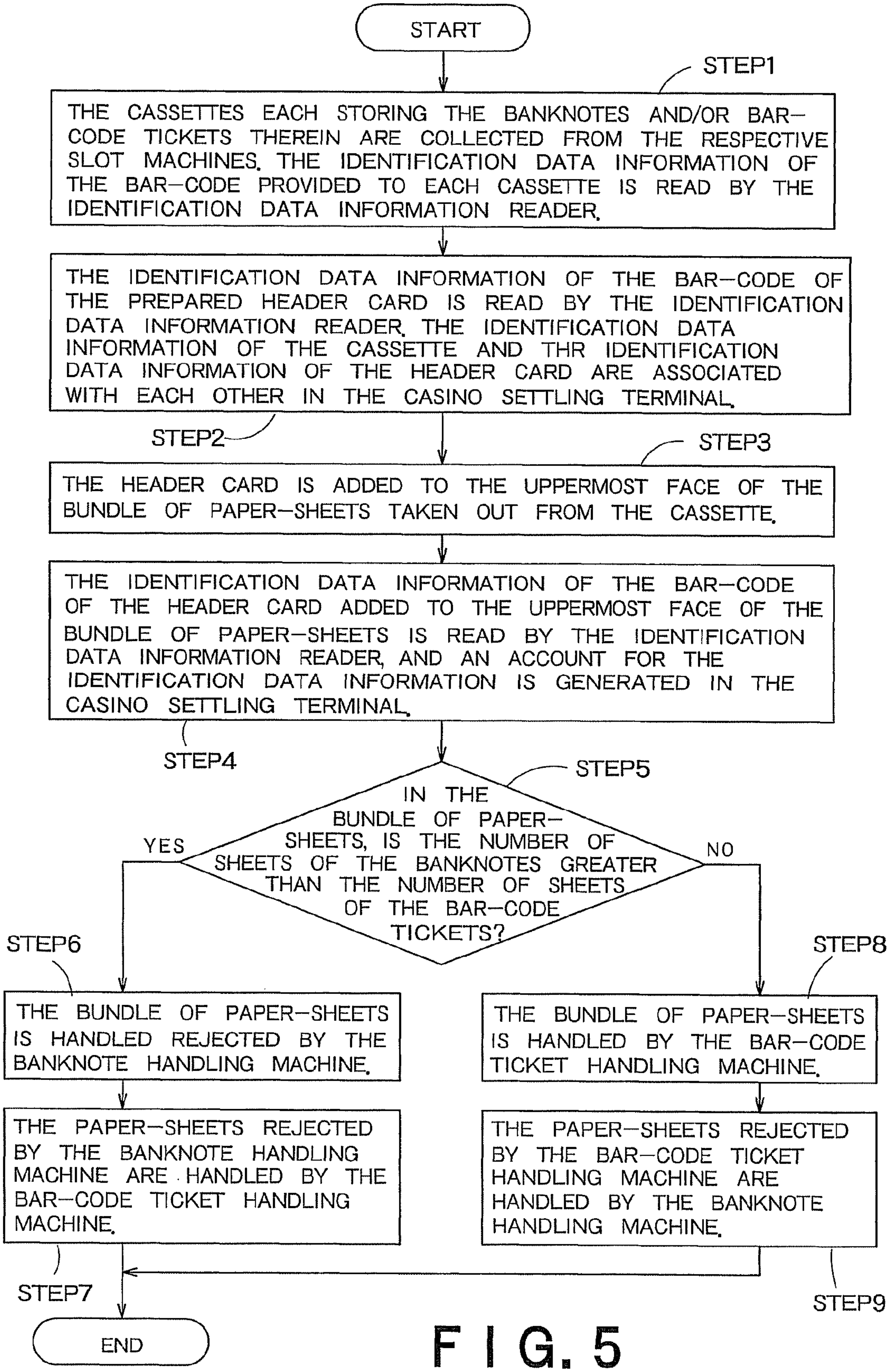
FIG. 5 is a total flow chart showing a handling operation for each bundle of paper-sheets in the paper-sheet handling system in FIG. 1.
Figure 6:
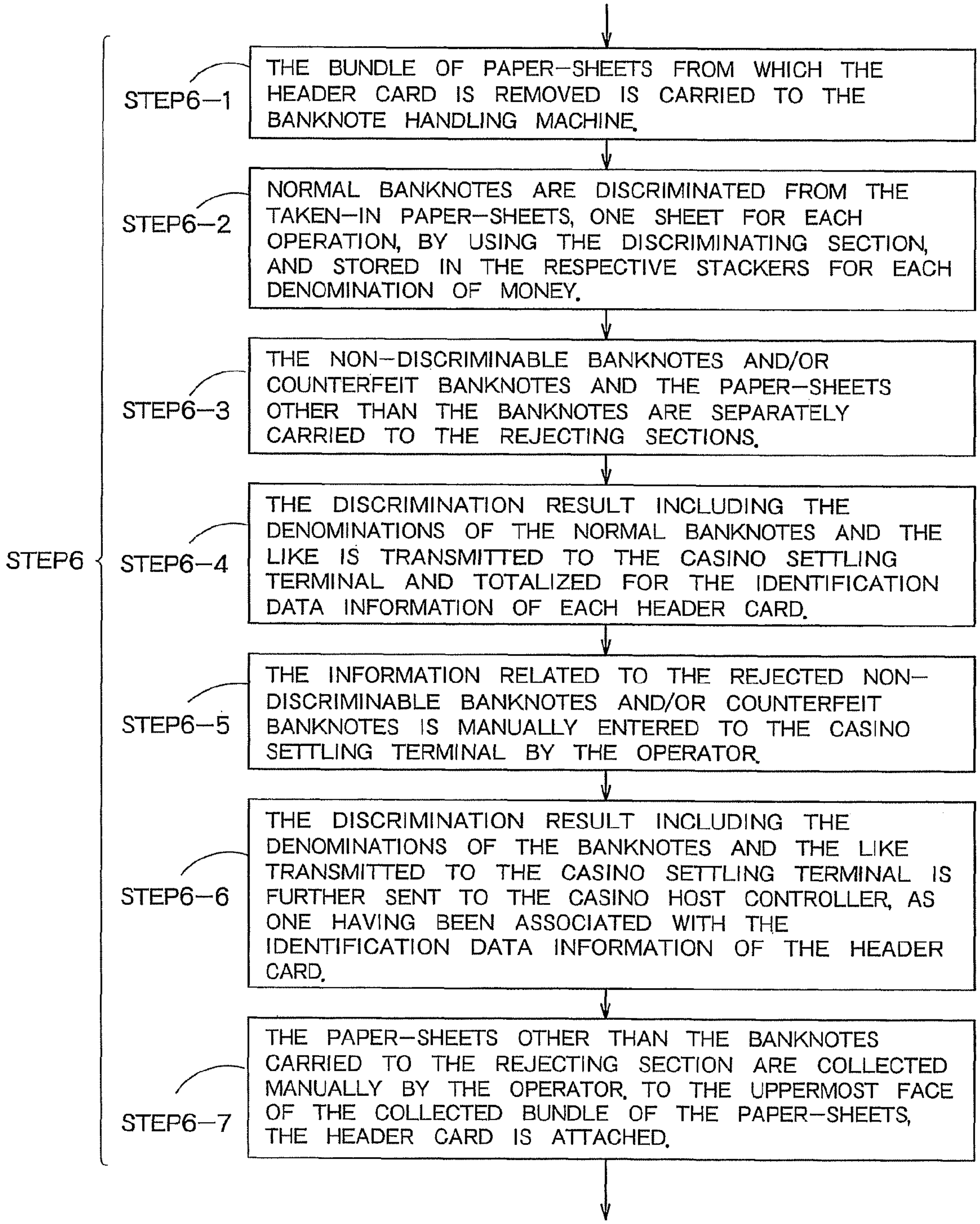
FIG. 6 is a flow chart showing details of the handling operation for the bundle of paper-sheets due to the banknote handling machine in the flow chart of FIG. 5.
Figure 7:
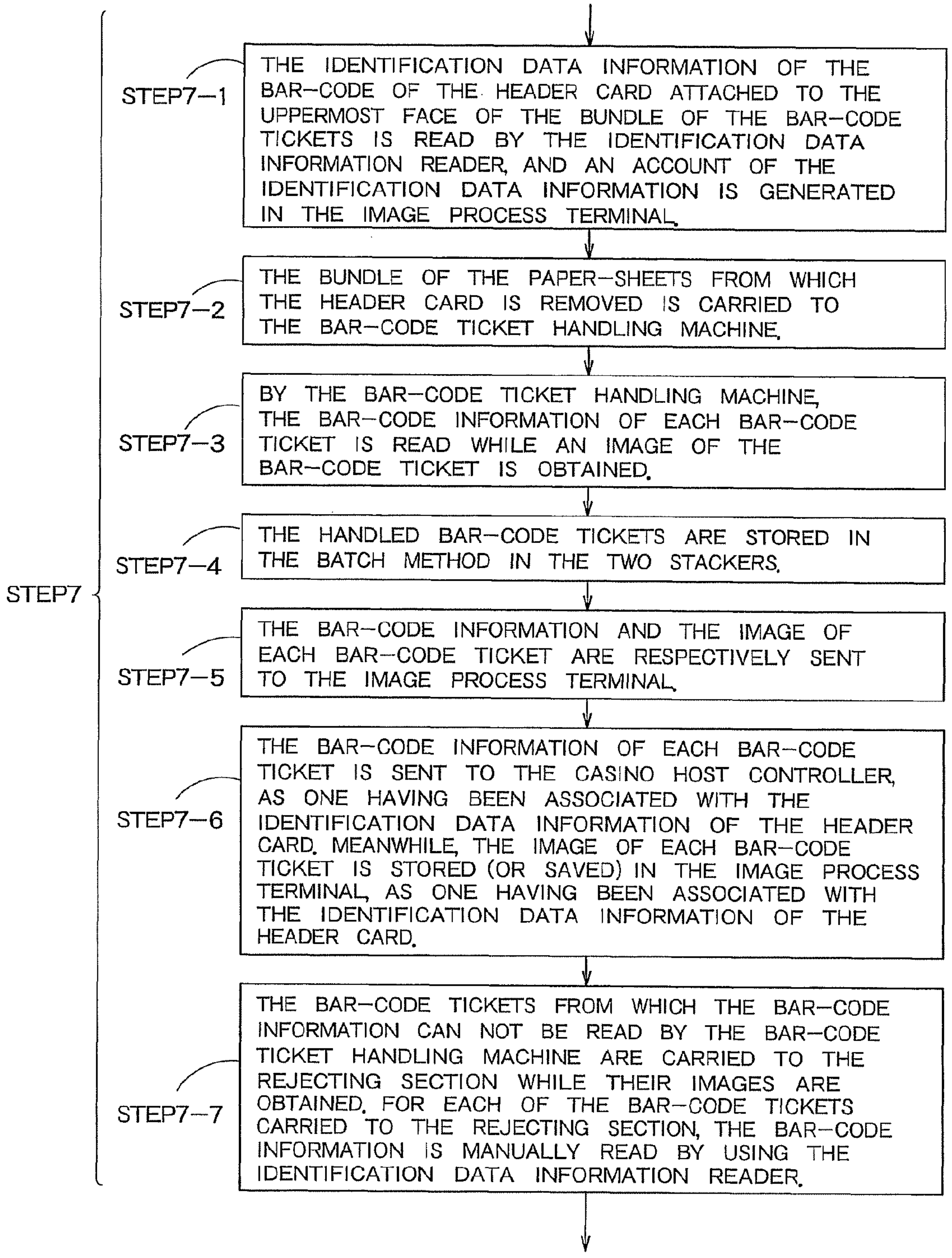
FIG. 7 is a flow chart showing details of the handling operation for the bundle of paper-sheets due to the bar-code ticket handling machine in the flow chart of FIG. 5.

FIG. 1 is a schematic view showing a general construction of the paper-sheet handling system of this embodiment. FIG. 2 is a schematic view showing a general construction of a banknote handling machine in the paper-sheet handling system in FIG. 1. FIG. 3 is a schematic view showing a general construction of a bar-code ticket handling machine in the paper-sheet handling system in FIG. 1. FIG. 4 is a block diagram for illustrating association of identification data information, in a casino host controller, a casino settling terminal and an image process terminal, respectively, in the paper-sheet handling system in FIG. 1. FIGS. 5 to 7 are flow charts each showing a handling operation for the bundle of paper-sheets in the paper-sheet handling system in FIG. 1.

As shown in FIG. 1, the paper-sheet handling system comprises a banknote handling machine 10 configured to take in paper-sheets included in the exterior, one sheet at a time, and discriminate banknotes from the paper-sheets taken therein, a bar-code ticket handling machine 20 configured to take in paper-sheets from the exterior, one sheet at a time, and read bar-code information of each bar-code ticket included in the paper-sheets taken therein while obtaining an image of the bar-code ticket, and an identification data information reader 30 configured to read identification data information from a header card, a cassette or the like. The header card will be described later. More specifically, a casino settling terminal 80 is communicatively connected with the banknote handling machine 10, and an image process terminal 82 is communicatively connected with the bar-code ticket handling machine 20. This paper-sheet handling system further includes a casino host controller 84 respectively connected, by means of communication, with the casino settling terminal 80 and the image process terminal 82. Now, each component of the paper-sheet handling system will be detailed with reference to FIGS. 2 to 4.

First, referring to FIG. 2, the banknote handling machine 10 will be described in detail. The banknote handling machine 10 is configured to take in paper sheets from the exterior, one sheet at a time, discriminate banknotes included in the paper sheets taken therein, and reject the paper-sheets when the paper-sheets other than the banknotes (for example, bar-code tickets or the like) are taken therein.

As shown in FIG. 2, the banknote handling machine 10 includes a taking-in section 11, a carrying section 12, a carrying state detecting section 13, a discriminating section 14, two rejecting sections 15A, 15B, four stackers 16A, 16B, 16C, 16D, and a control section 19. In addition, an operating section (not shown) composed of entering keys for entering indications from an operator and a displaying section (not shown) composed of a display device for displaying situations of storing banknotes into each stacker 16A, 16B, 16C, 16D are provided to the banknote handling machine 10.

The taken-in section 11 is configured such that the operator can place a bundle of paper-sheets thereon. In addition, the taking-in section 11 is adapted to take the paper sheets from the bundle of the paper sheets placed thereon into a body of the banknote handling machine 10, one sheet at a time. Such a taking-in operation of one sheet at a time due to the taking-in section 11 is performed in accordance with the control section 19 which will be described below.

The carrying section 12 is provided in the body of the banknote handling machine 10 and configured to carry the paper-sheets taken into the machine 10 by the taking-in section 11 to the stackers 16A, 16B, 16C, 16D or otherwise to rejecting sections 15A, 15B. The carrying section 12 is usually composed of one which is combined with a belt carrying mechanism. The belt carrying mechanism is composed of a pair of or three or more rollers and a belt, for example, a rubber belt, provided over the respective rollers. Again, the carrying section 12 is configured to carry the paper-sheets, one sheet at a time, in accordance with the control section 19 as will be described below.

The carrying state detecting section 13 is provided along the carrying section 12, and is composed of a sensor for detecting a carrying state of each paper-sheet taken in by the taking-in section 11. The carrying state detecting section 13 is configured to transmit a carrying abnormality signal to the control section 19 as described below, when it detects abnormality in carrying the paper-sheet. Specifically, the carrying state detecting section 13 sends the carrying abnormality signal to the control section 19 when each paper-sheet taken in by the taking-in section 11 is in an oblique state (or running obliquely), when a plurality of paper-sheets are taken in without a predetermined interval (or in a chain state), and/or when a plurality of paper-sheets are taken into the machine 10 in an overlapped state (or running in an overlapped state).

The discriminating section 14 is provided along the carrying section 12 on the downstream side of the carrying state detecting section 13, and is configured to discriminate sorts of banknotes (the denominations of money, counterfeit ones or not and damaged ones or not) included in the paper-sheets carried by the carrying section 12. The discriminating section 14 is composed of, for example, a pair of line sensors arranged on both sides of the carrying section 12, and is configured to transmit a discrimination signal for indicating a discrimination result to the control section 19 as described below after discriminating the sorts of the banknotes. Although the discriminating section 14 is provided on the downstream side relative to the carrying state detecting section 13, it may be provided on the upstream side of the carrying state detecting section 13, or otherwise it may be provided integrally with the carrying state detecting section 13.

The rejecting sections 15A, 15B are respectively configured to receive and reject the paper-sheets other than normal banknotes when the discrimination result for the paper-sheets due to the discriminating section 14 indicates that they are not the normal banknotes, and more specifically when the paper-sheets taken in by the taking-in section 11 are counterfeit banknotes, bar-code tickets or header cards. The header cards will be described later. Of the two rejecting sections 15A, 15B, the rejecting section 15A located on an upper stage is used for discharging abnormal banknotes, such as counterfeit banknotes or damaged ones, while the rejecting section 15B is used for discharging paper-sheets other than banknotes, for example, bar-code tickets, header cards and the like. Among the banknotes carried to the rejecting section 15A, information concerning the denominations of money and the like for non-discriminable banknotes and counterfeit banknotes is manually entered by the operator at the operating section. Alternatively, such information of banknotes transmitted to the rejecting section 15A may be directly entered, by the operator, to the casino settling terminal 80 as will be described below.

Each stacker 16A, 16B, 16C, 16D is configured to receive normal banknotes for each denomination of money when the discrimination result of the paper-sheets due to the discriminating section 14 indicates that they are normal ones. However, the method for carrying the banknotes to each stacker 16A, 16B, 16C, 16D is not limited to carrying them for each denomination of money, but, for example, it may be one for carrying the banknotes while they are classified into those placed with the front side being visible and those with the back side visible, or may be one for carrying the banknotes while they are classified into those oriented in a forward direction and those oriented in a backward direction, or may be one for carrying the banknotes based on another proper classification.

The control section 19 is connected with the taking-in section 11, carrying section 12, carrying state detecting section 13, discriminating section 14, operating section (not shown) and controlling section (not shown). The control section 19 is configured to receive the carrying abnormality signal concerning the abnormality in carrying the paper-sheets sent from the carrying state detecting section 13 as well as to receive the discrimination signal concerning the discrimination result of the paper-sheets sent from the discriminating section 14. All or part of such information can be displayed on the displaying section in accordance with the control section 19. The control section 19 is also configured to control operations of the taking-in section 11 and carrying section 12, distribution of the banknotes to each stacker 16A, 16B, 16C, 16D, and the like, based on the discrimination result of the paper-sheets due to the discriminating section 14. Furthermore, the control section 19 is configured to further transmit the discrimination result concerning the denominations of banknotes due to the discriminating section 14 to the casino settling terminal 80 as will be described below.

Next, details of the bar-code ticket handling machine 20 will be discussed with reference to FIG. 3. The bar-code ticket handling machine 20 is configured to take in the paper-sheets from the exterior, one sheet at a time, read bar-code information of each bar-code ticket included in the paper-sheets taken therein, obtain an image of the bar-code ticket, and reject the paper-sheets when the paper-sheets other than the bar-code tickets (for example, banknotes and the like) are taken into the machine 20.

As shown in FIG. 3, the bar-code ticket handling machine 20 includes a taking-in section 21, a carrying section 22, a carrying state detecting section 23, a discriminating section 24, an image obtaining section 27, a rejecting section 25, two stackers 26A, 26B, and a control section 29. In addition, an operating section (not shown) composed of entering keys for entering indications from an operator and a displaying section (not shown) composed of a display device for displaying situations of storing bar-code tickets into each stacker 26A, 26B are provided to the bar-code ticket handling machine 20.

The taking-in section 21 is configured such that the operator can place a bundle of paper-sheets thereon. The taking-in section 21 is also configured to take the paper sheets from the bundle of the paper sheets placed thereon into a body of the bar-code ticket handling machine 20, one sheet at a time. Such an operation for taking in one sheet at a time due to the taking-in section 21 can be performed in accordance with the control section 29 as will be described below.

The carrying section 22 is provided in the body of the bar-code ticket handling machine 20 and configured to carry the paper-sheets taken into the body of the bar-code ticket handling machine 20 to the stackers 26A, 26B or rejecting section 25. The carrying section 22 is usually composed of one which is combined with a belt carrying mechanism. The belt carrying mechanism is composed of a pair of or three or more rollers and a belt, for example, a rubber belt, provided over the respective rollers. Similarly, the carrying section 22 is configured to carry the paper-sheets, one sheet at a time, in accordance with the control section 29 as will be described below.

The carrying state detecting section 23 is provided along the carrying section 22, and is composed of a sensor for detecting a carrying state of each paper-sheet taken in by the taking-in section 21. The carrying state detecting section 23 is configured to transmit a carrying abnormality signal to the control section 29 described below, when it detects abnormality in carrying the paper-sheet. Specifically, the carrying state detecting section 23 sends the carrying abnormality signal to the control section 29 when each paper-sheet taken in by the taking-in section 21 is in an oblique state (or running obliquely), when a plurality of paper-sheets are taken in without a predetermined interval (or in a chain state), and/or when a plurality of paper-sheets are taken into the machine 20 in an overlapped state (or running in an overlapped state).

The discriminating section 24 is provided along the carrying section 22 on the downstream side of the carrying state detecting section 23, and is configured to discriminate whether the paper-sheets carried by the carrying section 22 are bar-code tickets or not. The discriminating section 24 is composed of, for example, a pair of line sensors arranged on both sides of the carrying section 22. Once the paper-sheets carried by the carrying section 22 are detected to be the bar-code tickets due to the discriminating section 24, the discriminating section 24 also reads the bar-code information of each bar-code ticket. More specifically, the discriminating section 24 reads the bar-code information of each bar-code ticket, for example, as an eighteen-digit number. The resultant discrimination signal concerning the paper-sheets (e.g., information concerning whether the paper-sheets are bar-code tickets or not) due to the discriminating section 24 and the bar-code information of each bar-code ticket read by the discriminating section 24 are then sent to the control section 29. Although the discriminating section 24 is provided on the downstream side relative to the carrying state detecting section 23, it may be provided on the upstream side of the carrying state detecting section 23, or otherwise it may be provided integrally with the carrying state detecting section 23.

The image obtaining section 27 is provided along the carrying section 22 on the downstream side of the discriminating section 24, and is configured to directly obtain the whole image of each bar-code ticket, in the case in which the paper-sheets carried into the image obtaining section 27 are discriminated to be the bar-code tickets due to the discriminating section 24. The image obtaining section 27 is composed of, for example, an image scanner. The image of each bar-code ticket obtained by the image obtaining section 27 will be sent to the control section 29.

The rejecting section 25 is configured to receive and reject the paper-sheets other than the bar-code tickets when the discrimination result of the paper-sheets due to the discriminating section 24 indicates that they are not the bar-code tickets, and more specifically when the paper-sheets taken in by the taking-in section 21 are banknotes or header cards as will be described below. To the rejecting section 25, the bar-code tickets that were not discriminable by the discriminating section 24 are also carried. In this case, the bar-code information (e.g., an eighteen-digit number) concerning such non-discriminable bar-code tickets by the discriminating section 24 is manually entered by the operator at the operating section. Alternatively, the bar-code information concerning each of such bar-code tickets not discriminable by the discriminating section 24 may be read by the operator by using the identification data information reader 30 (described below) which is communicatively connected with the image process terminal 82 (described below), and the so-read bar-code information may then be transmitted to the image process terminal 82.

Each stacker 26A, 26B is configured to receive the bar-code tickets in a batch method when the discrimination result for the paper-sheets due to the discriminating section 24 indicates that they are bar-code tickets. As used herein, the term "batch method" means a method in which, for example, the bar-code tickets are first carried into one stacker 26A, and when the number of bar-code tickets reaches a predetermined number, for example, one hundred (100), the bar-code tickets are then carried into the other stacker 26B, and during this operation, the operator takes out the one hundred (100) sheets of bar-code tickets having been stored in the one stacker 26A.

The control section 29 is connected with the taking-in section 21, carrying section 22, carrying state detecting section 23, discriminating section 24, image obtaining section 27, operating section (not shown) and controlling section (not shown). The control section 29 is configured to receive the carrying abnormality signal concerning the abnormality in carrying the paper-sheets sent from the carrying state detecting section 23, the discrimination signal concerning the discrimination result of the paper-sheets and the bar-code information concerning the bar-code tickets sent from the discriminating section 24, and the image of each bar-code ticket sent from the image obtaining section 27, respectively. All or part of the information can be displayed on the displaying section in accordance with the control section 29. The control section 29 is also configured to control operations of the taking-in section 21 and the carrying section 22, distribution of the bar-code tickets to each stacker 26A, 26B, and the like, based on the discrimination result for the paper-sheets due to the discriminating section 24. Furthermore, the control section 29 is configured to transmit the bar-code information concerning the bar-code tickets and obtained images to the image process terminal 82 as will be described below.

The bar-code ticket handling machine 20 constructed as described above can handle five hundred (500) or more sheets of bar-code tickets per minute, preferably six hundred (600) or more sheets of bar-code tickets per minute.

The identification data reader 30 is composed of a handy scanner or the like, which is communicatively connected with the casino settling terminal 80 and/or with the image process terminal 82, and is configured to read the identification data information provided to each header card and/or to read the identification data information provided in the cassette of each slot machine. In this case, the identification data information provided to each header card corresponds to the identification data information of each slot machine or to the identification data information of each cassette detachably attached to the slot machine.

More specifically, the header card is added to the uppermost face of each bundle of the paper-sheets including the banknotes and the bar-code tickets collected from the cassette of each amusement machine before the bundle is carried to the banknote handling machine 10 and/or to the bar-code ticket handling machine 20. In each header card, a bar-code corresponding to identification data information consisting of, for example, a twelve-digit number, is assigned. When the operator manually puts the identification data information reader 30 composed of a handy scanner or the like on the header card placed on the uppermost face of the bundle of the paper-sheets, the identification data information provided to the header card can be read. The so-read identification data information is then transmitted to the casino settling terminal 80 and/or to the image process terminal 82.

The casino settling terminal 80 is configured to receive the discrimination result including the denominations of banknotes or the like due to the discriminating section 14 transmitted from the banknote handling machine 10 as well as to receive the identification data information provided to each header card sent from the identification data information reader 30. Although the single banknote handling machine 10 is communicatively connected with the single casino settling terminal 80 in FIG. 11 a plurality of banknote handling machines 10 may be communicatively connected with the single casino settling terminal 80.

Next, association of the identification data information in the casino settling terminal 80 will be described with reference to FIG. 4.

As previously described, while the header card is added to the uppermost face of each bundle of the paper-sheets including at least one of the banknotes and the bar-code tickets collected from the cassette of each amusement machine before the bundle is carried to the banknote handling machine 10 and/or to the bar-code ticket handling machine 20, as shown in FIG. 4, in the casino settling terminal 80, the identification data information provided to each header card and the identification data information stored in the cassette provided to each amusement machine are associated with each other. Namely, the identification data information provided to each header card is sent to the casino settling terminal 80 each time the identification data information reader 30 reads the identification data information of the header card.

When the bundle of paper-sheets added with one header card is carried to the banknote handling machine 10, the discrimination result including the denominations of the banknotes and the like due to the discriminating section 14 transmitted from the banknote handling machine 10 is associated with the identification data information of the one header card as currency data. Namely, the discrimination result including the denominations of the banknotes and the like determined by the discriminating section 14 of the banknote handling machine 10 for the bundle of paper-sheets will be handled as one belonging to a group of the identification data information of the one header card added to the bundle of the paper-sheets. In addition, the information concerning non-discriminable banknotes and counterfeit banknotes once carried to the rejecting section 15A and manually entered, for example, by the operator at the operating section is also associated with the identification data information of the one header card as currency data.

Then, the casino settling terminal 80 transmits the discrimination result including the denominations of the banknotes and the like having been sent from the banknote handling machine 10 to the casino host controller 84 as described below, as one having been associated with the identification data information of the header card.

The image process terminal 82 is configured to receive the bar-code information (e.g., an eighteen-digit number) and the image obtained from each bar-code ticket, transmitted from the bar-code ticket handling machine 20 as well as to receive the identification data information provided to each header card sent from the identification data information reader 30. Although the single bar-code ticket handling machine 20 is communicatively connected with the single image process terminal 82 in FIG. 1, a plurality of bar-code ticket handling machines 20 may be communicatively connected with the single image process terminal 82.

Next, association of the identification data information in the image process terminal 82 will be described with reference to FIG. 4.

As with the case of the casino settling terminal 80, in the image process terminal 82, the identification data information provided to each header card, the bar-code information (e.g., an eighteen-digit number) and the image obtained from each bar-code ticket, transmitted from the bar-code ticket handling machine 20 are associated with one another. Namely, the identification data information provided to each header card is sent to the image process terminal 82 each time the identification data information reader 30 reads the identification data information from the header card. In this case, as the bar-code information of each bar-code ticket associated with the identification data information of the header card, the bar-code information sent to the rejecting section 25 of the bar-code ticket handling machine 20 and then manually entered, for example, by the operator, can be included, in addition to the data read by the discriminating section 24 of the bar-code ticket handling machine 20.

Then, the image process terminal 82 transmits the bar-code information (e.g., an eighteen-digit number) of the bar-code ticket sent from the bar-code ticket handling machine 20 to the casino host controller 84 as described below, as one having been associated with the identification data information of the header card. Furthermore, the image process terminal 82 is configured to store (or save) the image of the bar-code ticket sent from the bar-code ticket handling machine 20, as one having been associated with the identification data information of the header card.

The casino host controller 84 controls the whole casino and serves as a host system for the casino settling terminal 80 and the image process terminal 82. The casino host controller 84 is configured to receive the discrimination result including the denominations of banknotes and the like transmitted from the casino settling terminal 80, as one having been associated with the identification data information of each header card, as well as to receive the bar-code information of each bar-code ticket transmitted from the image process terminal 82, as one having been associated with the identification data information of the header card. The casino host controller 84 is configured to calculate the total amount of both the amount of the banknotes taken in the banknote handling machine 10 and the amount corresponding the bar-code tickets taken in the bar-code ticket handling machine 20, based on the information concerning the discrimination result of the banknotes, the information being sent from the banknote handling machine 10 and the bar-code information read from each bar-code ticket, the information being sent from the bar-code ticket handling machine 20.

Next, association of the identification data information in the casino host controller 84 will be described with reference to FIG. 4.

As shown in FIG. 4, in the casino host controller 84, the identification data information of each slot machine and the identification data information of the cassette detachably attached to the slot machine are associated with each other, and the header card provided with the bar code of the identification data information corresponding to the identification data information of each cassette is added to the bundle of the paper-sheets collected from the cassette. Then, the currency data of the banknotes transmitted from the casino settling terminal 80 and the data related to the bar-code information of the bar-code tickets transmitted from the image process terminal 82 are associated with the identification data information of each header card.

In this way, the casino host controller 84 controls a great amount of banknotes and bar-code tickets respectively collected from the cassette of each slot machine, for each identification data information of the cassette, i.e., for each identification data information of the slot machine.

Next, the operation of the paper-sheet handling system constructed as described above will be described with reference to flow charts as shown in FIGS. 5 to 7.

Each cassette storing the banknotes and/or bar-code tickets therein is collected from each slot machine. In this case, the identification data information of the bar code provided to each cassette is read by the identification data information reader 30, such as a handy scanner or the like, communicatively connected with the casino settling terminal 80 (Step 1 of FIG. 5). Then, the identification data information of the cassette is transmitted to the casino settling terminal 80.

Corresponding to each cassette, the header card is prepared. Before adding the header card to each bundle of the paper-sheets, the identification data information of the bar code of the prepared header card is read by the identification data information reader 30. Thereafter, the identification data information of the header card is transmitted to the casino settling terminal 80. In the casino settling terminal 80, the identification data information of the cassette and the identification data information of the header card are associated with each other (Step 2 of FIG. 2).

Subsequently, the bundle of paper-sheets including the banknotes and/or bar-code tickets are taken out from each cassette, and the header card is added to the uppermost face of the so-taken-out bundle of paper-sheets (Step 3 of FIG. 5).

Before having the banknote handling machine 10 or bar-code ticket handling machine 20 handle the bundle of paper-sheets, the identification data information of the header card attached onto the uppermost face of the bundle of paper-sheets is read by the identification data information reader 30. Then, the identification data information of the header card is transmitted to the casino settling terminal 80. In this manner, an account for the identification data information is generated in the casino settling terminal 80 (Step 4 of FIG. 5).

Thereafter, the operator determines which is greater, the number of sheets of the banknotes or the number of sheets of the bar-code tickets, in each collected bundle of paper-sheets (Step 5 of FIG. 5). If the number of sheets of the banknotes is greater in the bundle of paper-sheets, the bundle of paper-sheets is first handled by the banknote handling machine 10 (Step 6 of FIG. 5), and the paper-sheets rejected by the banknote handling machine 10 (e.g., the bar-code tickets or the like) are then handled by the bar-code ticket machine 20 (Step 7 of FIG. 5). Meanwhile, if the number of sheets of the bar-code tickets is greater in the bundle of paper-sheets, the bundle of paper-sheets is first handled by the bar-code ticket handling machine 20 (Step 8 of FIG. 5), and the paper-sheets rejected by the bar-code ticket handling machine 20 (e.g., the banknotes or the like) are then handled by the banknote handling machine 10 (Step 9 of FIG. 5). Hereinafter, the case in which the number of sheets of the banknotes is greater in the collected bundle of paper-sheets will be described in more detail with reference to FIGS. 6 and 7.

FIG. 6 is a flow chart showing details of the handling operation (Step 6 of FIG. 5) for the bundle of paper-sheets due to the banknote handling machine 10 in the flow chart of FIG. 5.

First, the header card is removed from the bundle of paper-sheets, and the bundle of paper-sheets from which the header card is removed is then carried to the banknote handling machine 10 (Step 6-1 of FIG. 6). In the banknote handling machine 10, the paper-sheets are taken, one sheet at a time. Then, the banknote handling machine 10 uses the discriminating section 14 to discriminate normal banknotes included in the paper-sheets taken into the machine 10 one sheet at a time, and has the stackers 16A, 16B, 16C, 16D store the normal banknotes for each denomination of the banknotes (Step 6-2 of FIG. 6). Meanwhile, the discriminating section 14 sends the non-discriminable banknotes and/or counterfeit banknotes to the rejecting section 15A as well as sends the paper-sheets other than the banknotes (e.g., the bar-code tickets or the like) to the rejecting section 15B (Step 6-3 of FIG. 6).

The discrimination result including the denominations of normal banknotes and the like determined by the discriminating section 14 is then transmitted to the casino settling terminal 80 and totalized for the identification data information of each header card (Step 6-4 of FIG. 6). Meanwhile, the information related to the non-discriminable banknotes and/or counterfeit banknotes carried to the rejecting section 15A is manually entered to the casino settling terminal 80 by the operator (Step 6-5 of FIG. 6).

The discrimination result including the denominations of banknotes and the like sent to the casino settling terminal 80 from the banknote handling machine 10 is further sent to the casino host controller 84, as one having been associated with the identification data information of the header card (Step 6-6 of FIG. 6).

Meanwhile, the paper-sheets other than the banknotes (e.g., bar-code tickets) carried to the rejecting section 15B of the banknote handling machine 10 are collected manually by the operator. To the uppermost face of the bundle of the bar-code tickets, the aforementioned header card is attached (Step 6-7 of FIG. 6). This bundle of the bar-code tickets is then handled by the bar-code ticket handling machine 20. FIG. 7 is a flow chart showing details of the handling operation (Step 7 of FIG. 5) for the bundle of paper-sheets due to the bar-code ticket handling machine 20.

Before having the bar-code ticket handling machine 20 handle the bundle of the bar-code tickets, the identification data information of the bar code of the header card attached to the uppermost face of the bundle of the bar-code tickets is read in advance by the identification data information reader 30 connected with the image process terminal 82. Thereafter, the identification data information of the header card is transmitted to the image process terminal 82. In this way, an account of the identification data information is generated in the image process terminal 82 (Step 7-1 of FIG. 7).

Thereafter, the header card is removed from the bundle of the bar-code tickets, and the bundle of the bar-code tickets from which the header card is removed is sent to the bar-code ticket handling machine 20 (Step 7-2 of FIG. 7). In the bar-code ticket handling machine 20, the bar-code tickets are taken, one sheet at a time. The bar-code ticket handling machine 20 then reads the bar-code information of each bar-code ticket taken therein one sheet at a time as well as obtains the image of the bar-code ticket (Step 7-3 of FIG. 7). Subsequently, the bar-code tickets are stored in the batch method in the two stackers 26A, 26B (Step 7-4 of FIG. 7), respectively.

The bar-code information of each bar-code ticket read by the bar-code ticket handling machine 20 and the image of the bar-code ticket obtained by the bar-code ticket handling machine 20 are respectively sent to the image process terminal 82 (Step 7-5 of FIG. 7).

Thereafter, the bar-code information of each bar-code ticket sent to the image process terminal 82 from the bar-code image handling machine 20 is further sent to the casino host controller 84, as one having been associated with the identification data information of the header card. Meanwhile, the image of each bar-code ticket sent to the image process terminal 82 from the bar-code ticket handling machine 20 is stored (or saved) in the image process terminal 82, as one having been associated with the identification data information of the header card (Step 7-6 of FIG. 7).

The bar-code tickets from which the bar-code information can not be read in the discriminating section 24 of the bar-code ticket handling machine 20 are sent to the rejecting section 25. For each of the bar-code tickets sent to the rejecting section 25, the image is also obtained by the image obtaining section 27. In addition, for each of the bar-code tickets sent to the rejecting section 25, the bar-code information is manually read by using the identification data information reader 30 communicatively connected with the image process terminal 82, and the so-read bar-code information is then sent to the image process terminal 82 (Step 7-7).

In the above description, one example in which each bundle of paper-sheets is first handled in the banknote handling machine 10 and then handled in the bar-code ticket handling machine 20 has been discussed. However, if the number of sheets of the bar-code tickets is greater than the number of sheets of the banknotes, in the bundle of paper-sheets collected from each slot machine, the bundle of paper-sheets may be first handled by the bar-code ticket handling machine 20 in the same manner as described above (see the flow chart of FIG. 7) and then handled by the banknote handling machine 10 in the same manner as described above (see the flow chart of FIG. 6).

If the bundle of paper-sheets in the cassette collected from the slot machine includes only either one of the banknotes or bar-code tickets, the paper-sheet handling system will be arranged only to use either one of the banknote handling machine 10 or bar-code ticket handling machine 20 to handle such a bundle of paper-sheets.

The casino host controller 84 receives the discrimination result including the denominations of banknotes and the like, the discrimination result having been associated with the identification data information of each header card and sent from the casino settling terminal 80, and also receives the bar-code information of each bar-code ticket, the information having been associated with the identification data information of the header card and sent form the image process terminal 82. Thereafter, the casino host controller 84 totalizes the banknote data sent from the casino settling terminal 80 and the bar-code data sent from the image process terminal 82, for the identification data information of each header card, and verifies the difference between the totalized result and the total of money received from the slot machine from which the cassette associated with the header card was collected. In addition, the casino host controller 84 prepares an analysis report based on the banknote data and the bar-code data for the identification data information of each header card.

As described above, according to the paper-sheet handling system and the method of use thereof, the bundle of paper-sheets including at least one of the banknotes and the barcode-tickets are handled first by either one of the banknote handling machine 10 or bar-code ticket handling machine 20, and the paper-sheets rejected from the one handling machine are then handled by the other handling machine. In this manner, the paper-sheet handling system is composed of the banknote handling machine 10 configured to discriminate the denominations of banknotes, counterfeit ones or not and damaged ones or not, and the like, and the bar-code ticket handling machine 20 configured to read the bar-code information of each bar-code ticket and obtain the image of the bar-code ticket. In addition, these handling machines are provided separately to the paper-sheet handling system. Therefore, the bundle of paper-sheets including the banknotes and the bar-code tickets in a mixed state can be handled with higher efficiency. Furthermore, since the banknote handling machine 10 and the bar-code ticket handling machine 20 are provided separately, if the number of sheets of only either one of the banknotes or bar-code tickets to be handled is significantly greater than the other, the number of either one of the banknote handling machine 10 or bar-code ticket handling machine 20 should only be increased, thus decreasing the initial cost. Furthermore, since the casino host controller 84 is communicatively connected both with the banknote handling machine 10 and with the bar-code ticket handling machine 20, information concerning the discrimination result of the banknotes can be sent from the banknote handling machine 10 to the casino host controller 84 as well as the bar-code information read from each bar-code ticket can be sent from the bar-code ticket handling machine 20 to the casino host controller 84.

In the bundle of paper-sheets of the cassette collected from each slot machine, either one of the banknotes or bar-code tickets, the number of sheets of which is greater than the other, are first handled by one corresponding handling machine, and the other rejected one, whose number of sheets is fewer, is then handled by the other corresponding handling machine. Therefore, as compared with the case of using a single machine provided with all of the functions for discriminating the banknotes, reading the bar-code of each bar-code ticket and obtaining the image of the bar-code ticket, the time required for handling the paper-sheets can be significantly reduced by the method of using the paper-sheet handling system of this embodiment.

If the bundle of paper-sheets of the cassette collected from the slot machine include only either one of the banknotes or bar-code tickets, the bundle of paper-sheets will be handled only by using either one of the banknote handling machine 10 or bar-code ticket handling machine 20. In such a manner, in the case in which the prepared bundle of paper-sheets include only either one of the banknotes or bar-code tickets, there is no need for handling the paper-sheets by using both of the banknote handling machines 10 and the bar-code ticket handling machine 20. Therefore, as compared with the case of using a single machine provided with all of the functions for discriminating the banknotes, reading the bar-code of each bar-code ticket and obtaining the image of the bar-code ticket, the time required for handling the paper-sheets can be significantly reduced.

Upon collecting the bundle of paper-sheets from each slot machine, the header card provided with the identification data information is added to the bundle of paper-sheets. Before the bundle of paper-sheets are handled by the bar-code ticket handling machine 20, the identification data of the header card added to the bundle of paper-sheets is read, and the bar-code information of each bar-code ticket read by the bar-code ticket handling machine 20 and information concerning the image obtained by the bar-code ticket handling machine 20 are associated with the so-read identification data information of the header card. In this way, the identification data information of each slot machine (or identification data information of the cassette detachably attached to each slot machine) and the bar-code information of each bar-code ticket and the information related to the image obtained therefrom can be associated with one another.

It should be appreciated that the paper-sheet handling system and the method of use thereof according to the present invention is not limited to the aspect described above, but various modifications may be added thereto.

For example, in the bar-code ticket handling machine 20, while an example, in which the discriminating section 24 and the image obtaining section 27 are separately provided, has been discussed in the previous embodiment, there is no need to separately provide such sections. For instance, the information obtained by the line sensors of the discriminating section 24 may also be used as the image information.

The number of the banknote handling machine 10 and that of the bar-code ticket handling machine 20 provided in the paper-sheet handling system are not limited to one, respectively, as shown in FIG. 1. Namely, the banknote handling machine 10 or bar-code ticket handling machine 20 (or otherwise both of them) may be provided in the paper-sheet handling system in plural numbers. In such a case, the banknote handling machines 10 and the bar-code ticket handling machines 20 are communicatively connected with the casino host controller 84, respectively, such that the number of the banknote handling machines 10 and that of the bar-code ticket handling machines 20 can be optionally changed.

In the case of handling the bundle of paper-sheets by using the bar-code ticket handling machine 20, the discriminating section 24 of the bar-code ticket handling machine 20 may be used to read the identification data information of the header card added to each bundle of paper-sheets, rather than employing the identification data information reader 30 connected with the image process terminal 82 in order to read the identification data information of the header card. In such a case, the discriminating section 24 of the bar-code ticket handling machine 20 can also read the identification data information of each header card, consisting of, for example, a twelve-digit number, in addition to reading the bar-code information of each bar-code ticket, consisting of, for example, an eighteen-digit number.

Figure 8:
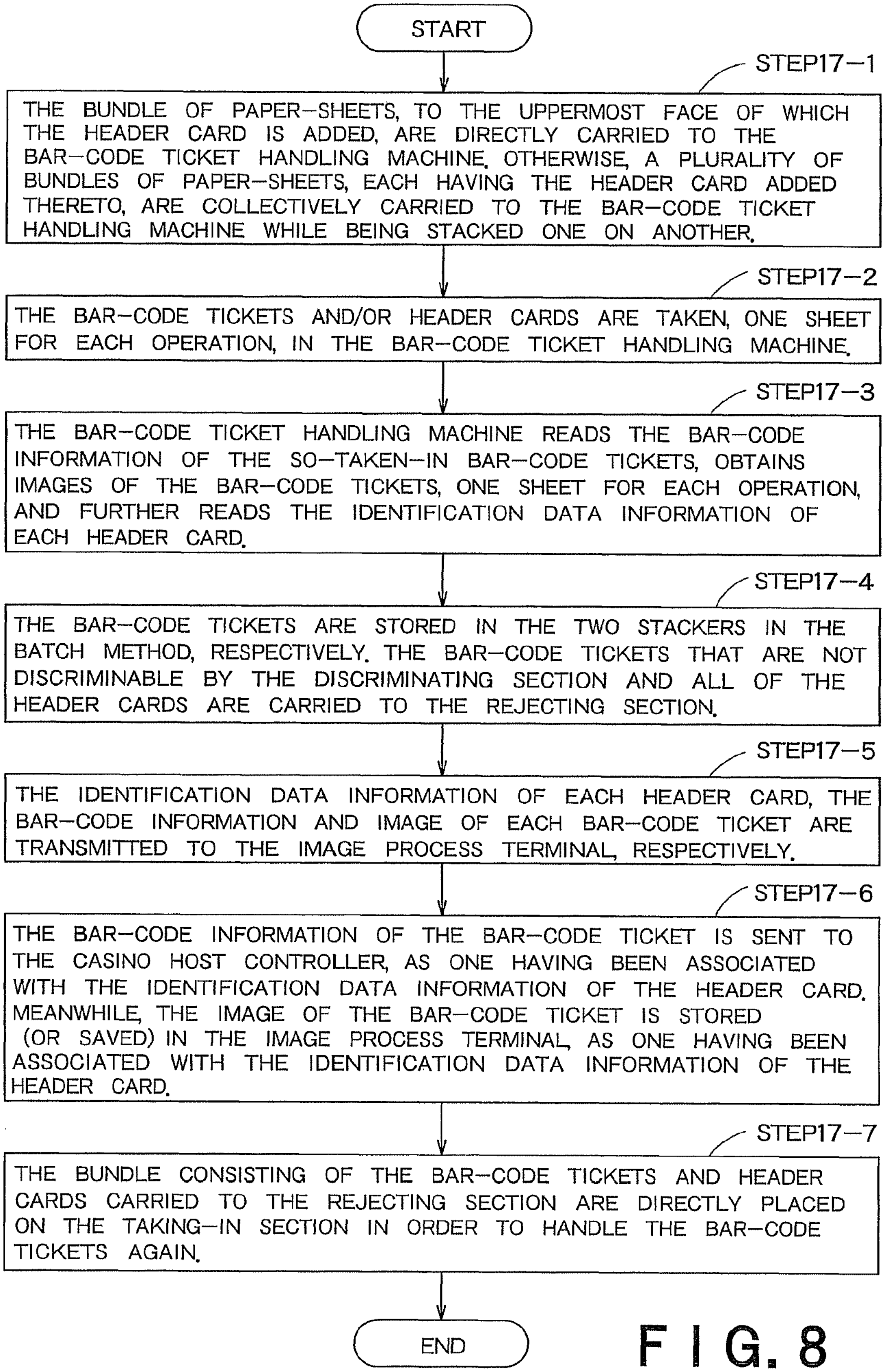
FIG. 8 is a flow chart showing details of another handling operation for the bundle of paper-sheets due to the bar-code ticket handling machine.

Now, a method of use of the bar-code ticket handling machine 20, in which the discriminating section 24 of the bar-code ticket handling machine 20 can also read the identification data information of each header card, will be described with reference to a flow chart shown in FIG. 8. FIG. 8 is the flow chart showing details of another handling operation for the bundle of paper-sheets due to the bar-code ticket handling machine 20.

First, the bundle of paper-sheets including bar-code tickets, to the uppermost face of which the header card is added, are directly carried to the bar-code ticket handling machine 20 (Step 17-1 of FIG. 8). In this case, before the bundle of paper-sheets are carried to the bar-code ticket handling machine 20, it is not necessary to read the identification data information of the bar code of the header card by using the identification data information reader 30.

Before the bundle of paper-sheets, to the uppermost face of which the header card is added, are carried to the bar-code ticket handling machine 20, a plurality of bundles of paper-sheets, each having the header card added thereto, may be collectively carried to the bar-code ticket handling machine 20 while being stacked one on another (Step 17-1).

Thereafter, in the bar-code ticket handling machine 20, the bar-code tickets and/or header cards are taken, one sheet at a time (Step 17-2 of FIG. 8). At this time, the bar-code ticket handling machine 20 reads the bar-code information of the so-taken-in bar-code tickets as well as obtains images of the bar-code tickets, one sheet at a time. Furthermore, the bar-code ticket handling machine 20 reads the identification data information of each header card by using the discriminating section 24 (Step 17-3 of FIG. 8). Subsequently, the bar-code tickets read by the discriminating section 24 are stored in the two stackers 26A, 26B in the batch method, respectively, while the bar-code tickets that can not be read by the discriminating section 24 and all of the header cards are carried to the rejecting section 25 (Step 17-4 of FIG. 8).

The identification data information of each header card read by the discriminating section 24 of the bar-code ticket handling machine 20 is sent to the image process terminal 82. In addition, the bar-code information of each bar-code ticket read by the discriminating section 24 of the bar-code ticket handling section 20 and the image of each bar-code ticket obtained by the image obtaining section 27 of the bar-code ticket handling machine 20 are also transmitted to the image process terminal 82 (Step 17-5 of FIG. 8).

The bar-code information transmitted to the image process terminal 82 from the bar-code ticket handling section 20 is further sent to the casino host controller 84, as one having been associated with identification data information of the header card. Meanwhile, the image of each bar-code ticket transmitted to the image process terminal 82 from the bar-code ticket handling machine 20 is stored (or saved) in the image process terminal 82, as one having been associated with the identification data information of the header card (Step 17-6 of FIG. 8).

In this manner, also in the paper-sheet handling system in which the discriminating section 24 of the bar-code ticket handling machine 20 can read the identification data information of each header card, as with the case of the paper-sheet handling system in which the identification data information of the header card added to each bundle of paper-sheet is read by the identification data information reader 30 connected with the image process terminal 82, the identification data information of the header card, the bar-code information of each bar-code ticket and the image obtained therefrom in the bar-code ticket handling process 20 can be associated with one another in the image process terminal 82.

On the other hand, the bar-code tickets that can not be read by the discriminating section 24 and all of the header cards are stored in the rejecting section 25 of the bar-code ticket handling machine 20. Therefore, in the case in which the plurality of bundles of paper-sheets are first stacked one on another, while each bundle having the header card thereon, before they are carried to the bar-code ticket handling machine 20, and the plurality of bundles of paper-sheets are then collectively carried to the bar-code ticket handling machine 20, all of the header cards and the bar-code tickets that can not be read by the discriminating section 24 among the bar-code tickets respectively corresponding to the header cards will be collectively stored in the rejecting section 25. Consequently, even though handling again the bar-code tickets by directly placing a bundle consisting of the bar-code tickets and the header cards having been carried to the rejecting section 25 on the taking-in section 21 (Step 17-7 of FIG. 8), since the respective header cards and the bar-code tickets corresponding to the header cards are gathered in the single bundle, the identification data information of each header card and the bar-code information and the obtained image of each bar-code ticket can be associated with one another in the image process terminal 82.

In this way, the bundles of paper-sheets are first stacked one on another, before they are carried to the bar-code ticket handling machine 20, while the header card provided with the identification data information is added to each bundle, and the plurality of bundles are then handled by the bar-code ticket handling machine 20. In this case, the bar-code ticket handling machine 20 may be configured to read the identification data information of the header card as well as to reject the header card, when it is carried to the bar-code ticket handling machine 20. In such a case, the plurality of bundles of paper-sheets to be collected from the cassettes of separate slot machines can be collectively handled by using the bar-code ticket handling machine 20 while these bundles of paper-sheets are stacked one on another. Therefore, the time required for handling the paper-sheets by using the bar-code ticket handling machine 20 can be securely reduced. In addition, the identification data information of each slot machine (or identification data information of the cassette detachably attached to the slot machine) and the bar-code information and the information related to the obtained image of the bar-code ticket corresponding to each slot machine can be associated with one another.

In the paper-sheet handling system described above, the header card provided with the identification data information is added to each bundle of paper-sheets when the bundle of paper-sheet is collected from each slot machine. In a further modification, however, the identification data information of the header card added to each bundle of paper-sheets may be read by the identification data information reader 30 before the bundle of paper-sheets are handled by the banknote handling machine 10, such that the discrimination information, including the denominations of banknotes, the amount of money and the like obtained by the banknote handling machine 10, and the identification information of each header card which is read can be associated with one another in the casino settling terminal 80. Consequently, the identification data information of each slot machine (or identification data information of the cassette detachably attached to the slot machine) and the discrimination information, including the denominations of banknotes, the amount of money and the like obtained by the banknote handling machine, can be associated with one another.

In this case, when handling the bundle of paper-sheets by using the banknote handling machine 10, the discriminating section 14 of the banknote handling machine 10 may be used to read the identification data information of the header card added to each bundle of paper-sheets, rather than employing the identification data information reader 30 in order to read the identification data information of the header card. In such a case, the discriminating section 14 of the banknote handling machine 10 can also read the identification data information of each header card, consisting of, for example, a twelve-digit number, in addition to performing the discrimination for the banknotes. Therefore, both the banknote handling machine 10 and the bar-code ticket handling machine 20 are configured to read the identification data information of the header card and to reject the header card. Thus, the discrimination information concerning the banknotes discriminated by the banknote handling machine 10 can be associated with the identification data information of the header card read by the banknote handling machine 10. Furthermore, the bar-code information of each bar-code ticket read by the bar-code ticket handling machine 20 and information concerning the image obtained by the bar-code ticket handling machine 20 are associated with the identification data information of the header card read by the bar-code ticket handling machine 20. Therefore, when header cards are added one by one on the top surface of the bundles of the paper-sheets collected from the cassettes of a plurality of the amusement machines and these bundles of the paper-sheets are handled by the banknote handling machine 10 and the bar-code ticket handling machine 20 collectively, it is possible to discriminate the cassette in which the paper-sheet is included in accordance with the header card, and it is possible to associate the information with only one identification data information of the header card, although the handling operations are done by both the banknote handling machine 10 and the bar-code ticket handling machine 20.

Now, still another paper-sheet handling system will be described with reference to FIG. 9. As compared with the paper-sheet handling system shown in FIG. 1, the paper-sheet handling system shown in FIG. 9 is different in a point that a paper-sheet storing drawer 40 is further provided to the system, but is substantially the same as the system shown in FIG. 1, in regard to the construction, except for that point.

The paper-sheet storing drawer 40 is configured to separately store the paper-sheets and the bar-code tickets while they are classified respectively, and is operated manually by a cashier. More specifically, when the cashier receives bar-code tickets from a patron, the cashier stores the bar-code tickets, by hand, into the paper-sheet drawer 40. Then, the cashier takes out banknotes corresponding to the bar-code tickets from the paper-sheet drawer 40 and hands them to the patron.

Figure 9:
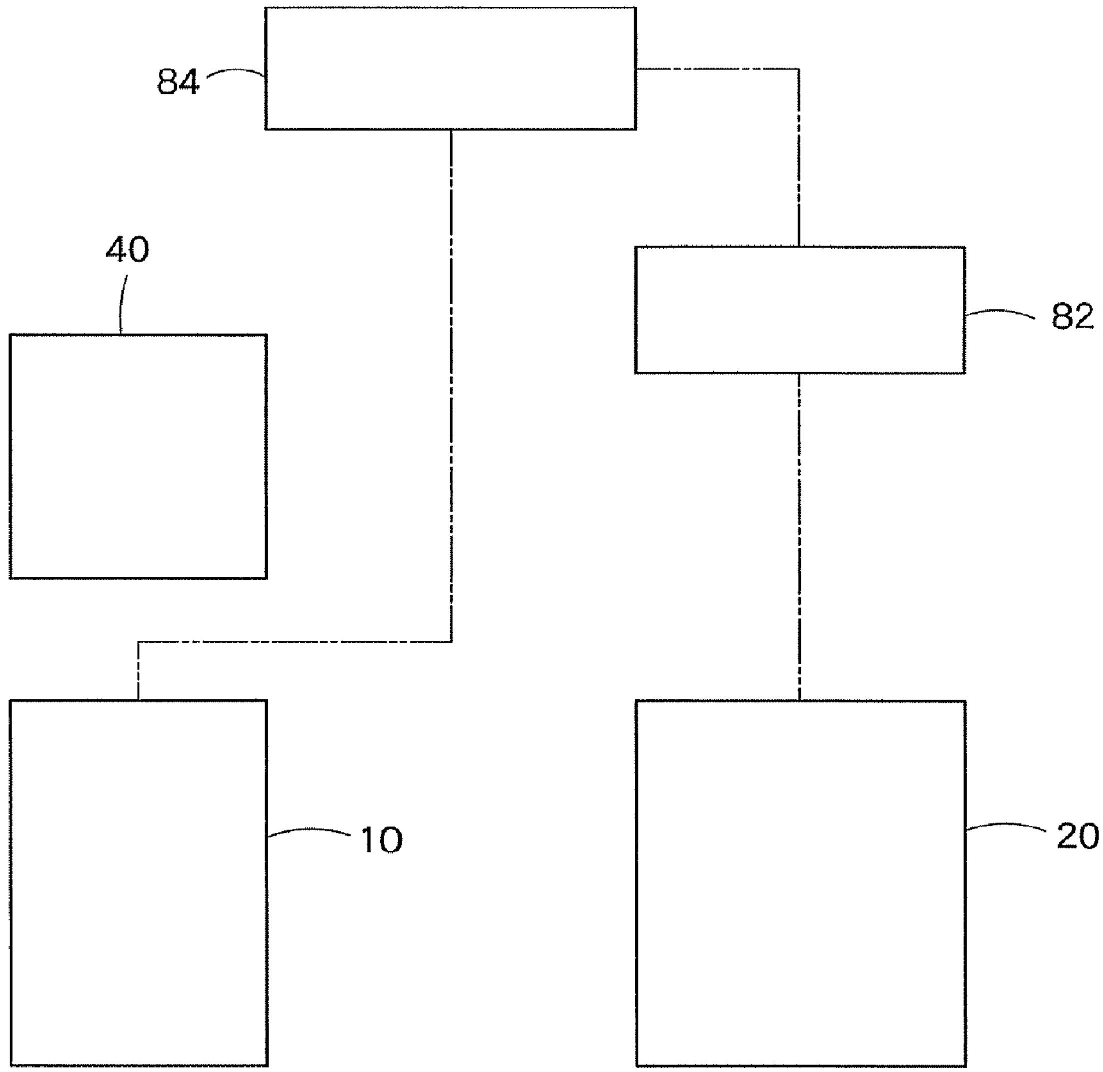
FIG. 9 is a schematic view showing a general construction of another paper-sheet handling system according to the present invention.

In this case, as shown in FIG. 9, the casino settling terminal 80 may not be provided, and the discrimination result including the denominations of banknotes/amount of money and the like obtained by the banknote handling machine 10 may be directly transmitted to the casino host controller 84. Of course, rather than employing the construction as shown in FIG. 9, the construction as shown in FIG. 1 may also be used, in which the discrimination result including the denominations of banknotes/amount of money and the like obtained by the banknote handling machine 10 is once sent to the casino settling terminal 80, and the information, such as the denominations of banknotes and the like, may then be transmitted to the casino host controller 84 from the casino settling terminal 80.

Next, a method of use of the paper-sheet handling system as shown in FIG. 9 will be discussed with reference to a flow chart shown in FIG. 10.

Figure 10:
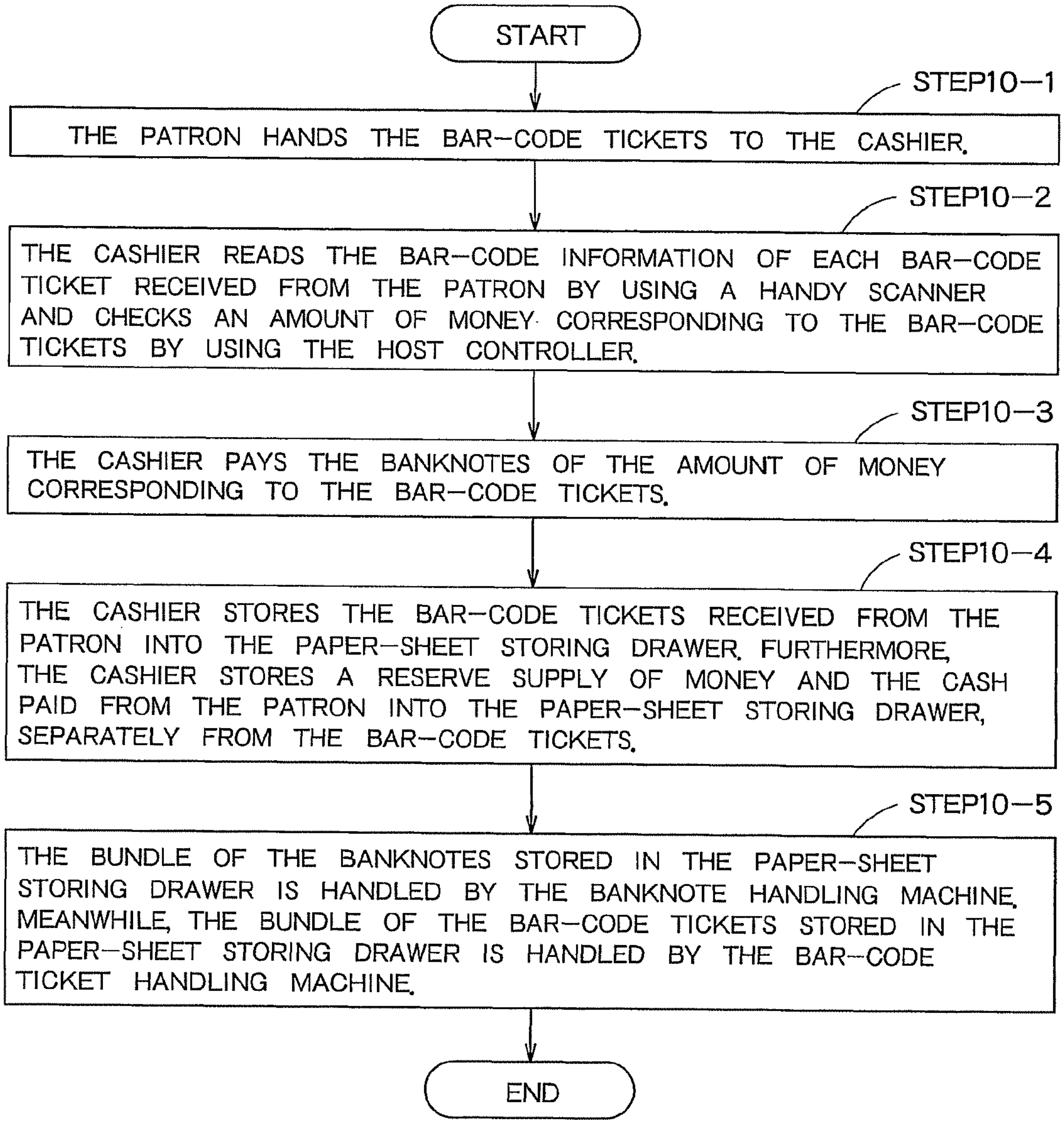
FIG. 10 is a flow chart showing a handling operation for the bundles of paper-sheets in the paper-sheet handling system in FIG. 9.

First, the patron hands the bar-code tickets paid from an amusement machine, such as a slot machine or the like, to the cashier standing by the paper-sheet storing drawer 40 (Step 10-1 of FIG. 10). The cashier then reads the bar-code information of each bar-code ticket received from the patron by using a handy scanner, and sends the bar-code information to the casino host controller 84, so as to check an amount of money corresponding to the bar-code tickets (Step 10-2 of FIG. 10). Thereafter, the cashier will pay the banknotes of the amount of money corresponding to the bar-code tickets (Step 10-3 of FIG. 10).

The cashier then stores the bar-code tickets received from the patron into the paper-sheet storing drawer 40. Furthermore, the cashier stores a reserve supply of money and the banknotes paid from the patron into the paper-sheet storing drawer 40, separately from the bar-code tickets (Step 10-4 of FIG. 10).

Among the paper-sheets stored in the paper-sheet storing drawer 40, the bundle of banknotes are carried to the banknote handling machine 10. Then, in the bank-note handling machine 10, the paper-sheets are taken in the handling machine 10, one sheet at a time. Subsequently, the bank-note handling machine 10 discriminates normal banknotes from the paper-sheets taken in the machine 10, one sheet at a time, by using the discriminating section 14, and then stores the discriminated normal banknotes into the respective stackers 16A, 16B, 16C, 16D, for each denomination of money. Meanwhile, the non-discriminable banknotes and counterfeit banknotes so judged in the discriminating section 14 are carried to the rejecting sections 15A or 15B. Moreover, the discrimination result including the denominations of the normal banknotes and the like obtained due to the discriminating section 14 will be displayed on the displaying section provided in the banknote handling machine 10 and/or transmitted to the casino host controller 84.

Furthermore, among the paper-sheets stored in the paper-sheet storing drawer 40, the bundle of bar-code tickets are carried to the bar-code ticket handling machine 20. The bar-code ticket handling machine 20 takes in the bar-code tickets, one sheet at a time, from the exterior, and then reads the bar-code information of each bar code ticket by using the discriminating section 24 as well as obtains the image of the bar code ticket by using the image obtaining section 27. The bar-code information and image of each bar-code ticket are then transmitted to the image process terminal 82 installed as a host, system. In this way, the image process terminal 82 stores (or saves) the images of the bar-code tickets sent from the bar-code ticket handling machine 20.

According to the paper-sheet handling system and the method of use thereof shown in FIGS. 9 and 10, the banknotes and the bar-code tickets are classified in advance and then stored as separate bundles in the paper-sheet storing drawer 40, and the so-stored bundle of the banknotes will be handled in the bank-note handling machine 10 as well as the so-stored bundle of the bar-code tickets will be handled in the bar-code ticket handling machine 20 (Step 10-5 of FIG. 10). In this case, as compared with the case of handling the separately prepared bundles of the banknotes and bar-code tickets, by using a single machine provided with all of the functions for discriminating the banknotes, reading the bar-code information of each bar-code ticket and obtaining the image of each bar-code ticket, the time required for handling the paper-sheets can be significantly reduced.

Preferably, the handling of the banknotes due to the banknote handling machine 10 and the handling of bar-code tickets due to the bar-code handling machine 20 are performed in parallel with each other. In this case, because the handlings of the banknotes and bar-code tickets can be performed at substantially the same time, the handling time can be further reduced.

Figure 11:
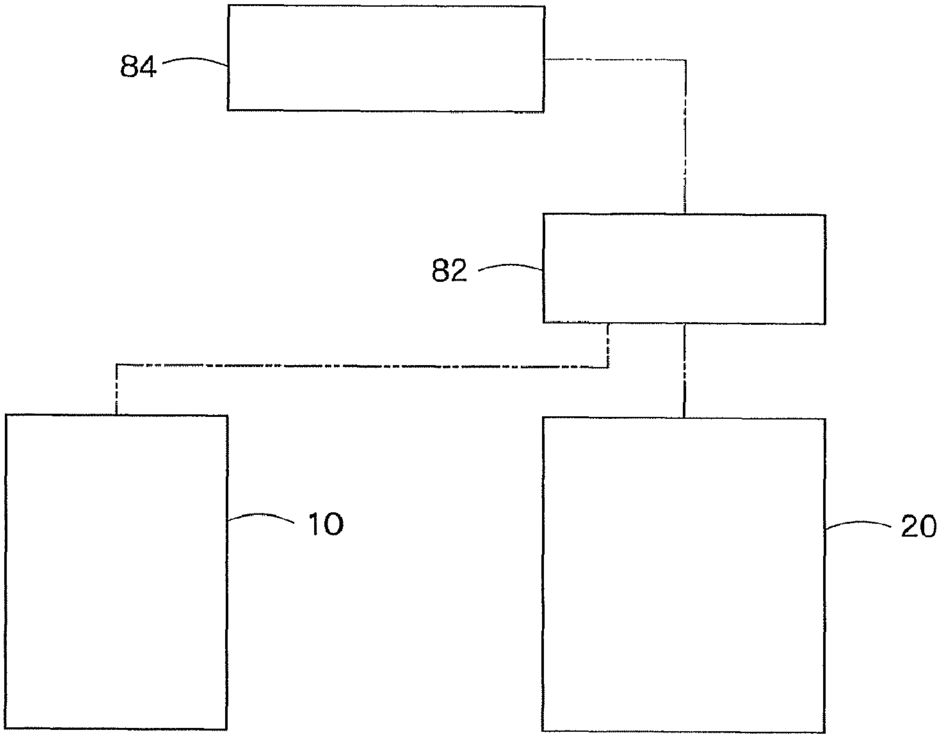
FIG. 11 is a schematic view showing a general construction of still another paper-sheet handling system according to the present invention.
Figure 12:
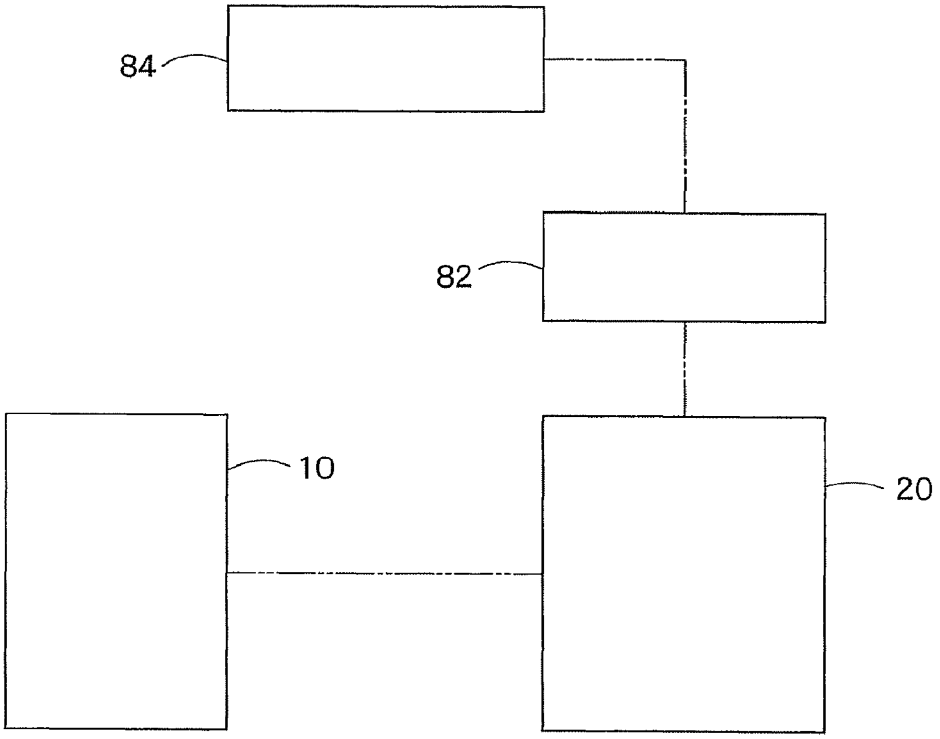
FIG. 12 is a schematic view showing a general construction of still yet another paper-sheet handling system according to the present invention.

Next, yet another example of the paper-sheet handling system will be described with reference to FIGS. 11 and 12. FIGS. 11 and 12 are schematic views respectively showing a general construction of yet another paper-sheet handling system according to the present invention.

The paper-sheet handling system shown in FIG. 11 is one related to another example of the paper-sheet handling system according to the present invention. In this example of the paper-sheet handling system, the banknote handling machine 10 and the bar-code ticket handling machine 20 are communicatively connected with the image process terminal 82, respectively. The image process terminal 82 is in turn communicatively connected with the casino host controller 84. Thus, the discrimination result including the denominations of banknotes/amount of money and the like obtained due to the banknote handling machine 10 is transmitted to the casino host controller 84 via the image process terminal 82. Meanwhile, the bar-code information of each bar-code ticket read by the bar-code ticket handling machine 20 is transmitted to the casino host controller 84 via the image process terminal 82, while the image of each bar-code ticket obtained due to the bar-code ticket handling machine 20 is stored (or saved) in the image process terminal 82.

In the paper-sheet handling system as shown in FIG. 11, it is contemplated that the number of the banknote handling machine 10 may be one or more and the number of the bar-code ticket handling machine 20 may also be one or more. Furthermore, in such a case, the respective banknote handling machines 10 and the respective bar-code ticket handling machines 20 may be communicatively connected with the single image process terminal 82, respectively, such that the number of banknote handling machines 10 and the number of bar-code ticket handling machines 20 can be optionally changed, respectively.

The paper-sheet handling system shown in FIG. 12 is one related to yet another example of the paper-sheet handling system according to the present invention. In this paper-sheet handling system, the banknote handling machine 10 is communicatively connected with the bar-code ticket handling machine 20, and the bar-code ticket handling machine 20 is in turn communicatively connected with the image process terminal 82. In addition, the image process terminal 82 is communicatively connected with the casino host controller 84. Thus, the discrimination result including the denominations of banknotes/amount of money and the like obtained due to the banknote handling machine 10 is transmitted to the casino host controller 84 via the bar-code ticket handling machine 20 and the image process terminal 82. Meanwhile, the bar-code information of each bar-code ticket read by the bar-code ticket handling machine 20 is transmitted to the casino host controller 84 via the image process terminal 82, while the image of each bar-code ticket obtained due to the bar-code ticket handling machine 20 is stored (or saved) in the image process terminal 82.

In the paper-sheet handling system as shown in FIG. 12, it is contemplated that the number of the banknote handling machine 10 may be one or more and the number of the bar-code ticket handling machine 20 may also be one or more. Furthermore, in such a case, the respective banknote handling machines 10 may be communicatively connected with the respective bar-code ticket handling machines 20, respectively, such that the number of banknote handling machines 10 and the number of bar-code ticket handling machines 20 can be optionally changed, respectively.

The paper-sheet handling system according to the present invention is not limited to those for handling the bundles of banknotes and/or bar-code tickets collected from each amusement machine, such as a slot machine or the like, in a casino, but may be applied to those for handling the bundles of banknotes and/or bar-code tickets collected from, for example, a register or the like in a convenience store or the like. Furthermore, the paper-sheet handling system of this invention can have other applications than those described herein.

The invention claimed is:

1. A method of use of a paper-sheet handling system comprising the steps of:

preparing a paper-sheet handling system configured to handle a bundle of paper-sheets including banknotes and bar-code tickets, the paper-sheet handling system including a banknote handling machine configured to take in paper-sheets, one sheet at a time, discriminate the banknotes included in the paper-sheets taken therein, and reject the paper-sheets when paper-sheets other than the banknotes are taken therein, a bar-code ticket handling machine configured to take in the paper-sheets, one sheet at a time, read bar-code information of each bar-code ticket included in the paper-sheets taken therein while obtaining an image of the bar-code ticket, and reject the paper-sheets when paper-sheets other than the bar-code tickets are taken therein, and a host controller being communicatively connected both with the banknote handling machine and with the bar-code ticket handling machine, information concerning the discrimination result of the banknotes being sent from the banknote handling machine to the host controller as well as the bar-code information read from each bar-code ticket being sent from the bar-code ticket handling machine to the host controller;

preparing the bundle including the banknotes and the bar-code tickets; and first having either one handling machine of the banknote handling machine or bar-code ticket handling machine handle the prepared bundle of paper-sheets, and then having the other handling machine handle the paper-sheets that are rejected by the first used handling machine, wherein the banknote handling machine and the bar-code ticket handling machine are physically separate, the bar-code ticket handling machine includes an image obtaining section that directly obtains the whole image of each bar-code ticket, and the bar-code ticket handling machine is capable of handling five hundred or more sheets of bar-code tickets per minute.

2. The method of use of the paper-sheet handling system according to claim 1, further comprising the steps of:

sending the information concerning the discrimination result of the banknotes from the banknote handling machine to the host controller, and sending the bar-code information read from each bar-code ticket from the bar-code ticket handling machine to the host controller, and calculating the total amount of both the amount of the banknotes taken in the banknote handling machine and the amount corresponding the bar-code tickets taken in the bar-code ticket handling machine by the host controller, based on the information concerning the discrimination result of the banknotes sent from the banknote handling machine and the bar-code information read from each bar-code ticket sent from the bar-code ticket handling machine.

3. The method of use of the paper-sheet handling system according to claim 1, wherein upon preparing the bundle of paper-sheets including the banknotes and the bar-code tickets, the bundle of paper-sheets are collected from the paper-sheet handling system, and a medium provided with identification data information is added to the bundle of paper-sheets when the bundle of paper-sheets are collected, wherein before the bundle of paper-sheets are handled by the bar-code ticket handling machine, the identification data information of the medium added to the bundle of paper-sheets is read, and wherein the bar-code information of each bar-code ticket read by the bar-code ticket handling machine and information concerning the image obtained by the bar-code ticket handling machine are associated with the identification data information of the medium.

4. The method of use of the paper-sheet handling system according to claim 3, wherein before the bundle of paper-sheets are handled by the banknote handling machine, the identification data information of the medium added to the bundle of paper-sheets is read, and wherein discrimination information concerning the banknotes discriminated by the banknote handling machine and the identification data information of the medium are associated with each other.

5. The method of use of the paper-sheet handling system according to claim 1, wherein upon preparing the bundle of paper-sheets including the banknotes and the bar-code tickets, the bundle of paper-sheets are collected from the paper-sheet handling system, and a medium provided with identification data information is added to the bundle of paper-sheets when the bundle of paper-sheets are collected, wherein the bar-code ticket handling machine is configured to read the identification data information of the medium, and wherein the bar-code information of each bar-code ticket read by the bar-code ticket handling machine and the information concerning the image obtained by the bar-code ticket handling machine are associated with the identification data information of the medium read by the bar-code ticket handling machine.

6. The method of use of the paper-sheet handling system according to claim 5, wherein before the bundle of paper-sheets added with the medium provided with the identification data information are carried to the bar-code ticket handling machine, a plurality of bundles of paper-sheets, each added with the medium, are stacked one on another, such that the plurality of bundles of paper-sheets are collectively handled by the bar-code ticket handling machine, and wherein the bar-code ticket handling machine is configured to read the identification data information of each medium when the medium is carried thereto as well as to reject the medium.

7. The method of use of the paper-sheet handling system according to claim 6, wherein both the banknote handling machine and the bar-code ticket handling machine are configured to read the identification data information of the medium and to reject the medium, and wherein the discrimination information concerning the banknotes discriminated by the banknote handling machine is associated with the identification data information of the medium read by the banknote handling machine.

8. The method of use of the paper-sheet handling system according to claim 1, wherein the bar-code ticket handling machine can handle six hundred or more sheets of bar-code tickets per minute.

9. A method of use of a paper-sheet handling system comprising the steps of:

preparing a paper-sheet handling system configured to handle a bundle of paper-sheets including banknotes and bar-code tickets, the paper-sheet handling system including a banknote handling machine configured to take in paper-sheets, one sheet at a time, discriminate the banknotes included in the paper-sheets taken therein, and reject the paper-sheets when the paper-sheets other than the banknotes are taken therein, a bar-code ticket handling machine configured to take in paper-sheets, one sheet at a time, read the bar-code information of each bar-code ticket included in the paper-sheets taken therein while obtaining an image of the bar-code ticket, and reject the paper-sheets when paper-sheets other than the bar-code tickets are taken therein, and a host controller being communicatively connected both with the banknote handling machine and with the bar-code ticket handling machine, information concerning the discrimination result of the banknotes being sent from the banknote handling machine to the host controller as well as the bar-code information read from each bar-code ticket being sent from the bar-code ticket handling machine to the host controller;

classifying the banknotes and the bar-code tickets in advance and preparing the respective bundles separately; and having the banknote handling machine handle the prepared bundle of the banknotes while having the bar-code ticket handling machine handle the prepared bundle of the bar-code tickets, wherein the banknote handling machine and the bar-code ticket handling machine are physically separate, the bar-code ticket handling machine includes an image obtaining section that directly obtains the whole image of each bar-code ticket, and the bar-code ticket handling machine is capable of handling five hundred or more sheets of bar-code tickets per minute.

10. The method of use of the paper-sheet handling system according to claim 9, further comprising the steps of:

sending the information concerning the discrimination result of the banknotes from the banknote handling machine to the host controller, and sending the bar-code information read from each bar-code ticket from the bar-code ticket handling machine to the host controller, and calculating the total amount of both the amount of the banknotes taken in the banknote handling machine and the amount corresponding the bar-code tickets taken in the bar-code ticket handling machine by the host controller, based on the information concerning the discrimination result of the banknotes sent from the banknote handling machine and the bar-code information read from each bar-code ticket sent from the bar-code ticket handling machine.

11. The method of use of the paper-sheet handling system according to claim 9, wherein the handling of the banknotes due to the banknote handling machine and the handling of bar-code tickets due to the bar-code ticket handling machine are performed in parallel with each other.

12. A method of use of a bar-code ticket handling machine for use in handling a bundle of paper-sheets including bar-code tickets, the bar-code ticket handling machine being configured to take in paper-sheets, one sheet at a time, read the bar-code information of each bar-code ticket included in the paper-sheets taken therein while obtaining an image of the bar-code ticket, the method comprising the steps of:

collecting the bundle of paper-sheets including the bar-code tickets from the bar-code ticket handling machine;

adding a medium provided with identification data information to the bundle of paper-sheets when the bundle of paper-sheets are collected from the bar-code ticket handling machine;

stacking a plurality of bundles with the medium provided with the identification data collectively, on the bar-code ticket handling machine;

having the bar-code ticket handling machine process the plurality of paper-sheets collectively, and during the handling, having the bar-code ticket handling machine read the identification data information of each medium included in each bundle of paper-sheets;

associating the bar-code information of each bar-code ticket read by the bar-code ticket handling machine and information concerning the image obtained by the bar-code ticket handling machine with the identification data information of the medium read by the bar-code ticket handling machine; and rejecting the medium which has been read and also rejecting the paper-sheets, for which the bar-code information could not be read, wherein the bar-code ticket handling machine includes an image obtaining section that directly obtains the whole image of each bar-code ticket, and the bar-code ticket handling machine is capable of handling five hundred or more sheets of bar-code tickets per minute.

13. A method of use of a bar-code ticket handling machine according to claim 12, further comprising the steps of:

having the bar-code ticket handling machine handle the plurality of the bundles of paper-sheets, each bundles having the medium, the plurality of the bundles of paper-sheets being rejected from the bar-code ticket handling machine.

14. A paper-sheet handling system for use in handling a bundle of paper-sheets including banknotes and bar-code tickets, the paper-sheet handling system comprising:

a banknote handling machine configured to take in paper-sheets, one sheet at a time, discriminate the banknotes included in paper-sheets taken therein, and reject the paper-sheets when the paper-sheets other than the banknotes are taken therein;

a bar-code ticket handling machine configured to take in paper-sheets, one sheet at a time, read the bar-code information of each bar-code ticket included in the paper-sheets taken therein while obtaining an image of the bar-code ticket, and reject the paper-sheets when the paper-sheets other than bar-code tickets are taken therein; and a host controller, which is communicatively connected both with the banknote handling machine and with the bar-code ticket handling machine, and to which information concerning the discrimination result of the banknotes is sent from the banknote handling machine as well as to which the bar-code information read from each bar-code ticket is sent from the bar-code ticket handling machine, wherein the banknote handling machine and the bar-code ticket handling machine are physically separate, the bar-code ticket handling machine includes an image obtaining section that directly obtains the whole image of each bar-code ticket, and the bar-code ticket handling machine is capable of handling five hundred or more sheets of bar-code tickets per minute.

15. The paper-sheet handling system according to claim 14, wherein the host controller is configured to calculate the total amount of both the amount of the banknotes taken in the banknote handling machine and the amount corresponding the bar-code tickets taken in the bar-code ticket handling machine, based on the information concerning the discrimination result of the banknotes sent from the banknote handling machine and the bar-code information read from each bar-code ticket sent from the bar-code ticket handling machine.

16. The paper-sheet handling system according to claim 14, further comprising an image process terminal, which is communicatively connected with the bar-code ticket handling machine, and to which the information concerning the image obtained from the bar-code ticket is sent from the bar-code ticket handling machine.

17. The paper-sheet handling system according to claim 14, wherein the number of the banknote handling machines is one or more and the number of the bar-code ticket handling machines is one or more, and wherein the respective banknote handling machines and the respective bar-code ticket handling machines are communicatively connected with the host controller, respectively, such that the number of banknote handling machines or the number of bar-code ticket handling machines can be changed, respectively.

18. The paper-sheet handling system according to claim 14, wherein the bundle of paper-sheets including the banknotes and the bar-code tickets are collected from the exterior of the paper-sheet handling system, and a medium provided with identification data information is added to the bundle of paper-sheets when the bundle of paper-sheets are collected from the exterior, wherein the paper-sheet handling system further comprises a media information reader configured to read the identification data information of the medium added to the bundle of paper-sheets, and wherein at least one of the bar-code information of each bar-code ticket read by the bar-code ticket handling machine and information concerning the image obtained by the bar-code ticket handling machine are associated with the identification data information of the medium read by the media information reader before the bundle of paper-sheets are handled by the bar-code ticket handling machine.

19. The paper-sheet handling system according to claim 18, wherein the discrimination information concerning the banknotes discriminated by the banknote handling machine and the identification data information of the medium read by the media information reader before the bundle of paper-sheets are handled by the banknote handling machine are associated with each other.

20. The paper-sheet handling machine according to claim 14, wherein the bundle of paper-sheets including the banknotes and the bar-code tickets are collected from the paper-sheet handling system, and a medium provided with identification data information is added to the bundle of paper-sheets when the bundle of paper-sheets are collected, wherein the bar-code ticket handling machine is configured to read the identification data information of the medium, and wherein the bar-code information of each bar-code ticket read by the bar-code ticket handling machine and information concerning the image to be obtained by the bar-code ticket handling machine are associated with the identification data information of the medium obtained by the bar-code ticket handling machine.

21. The paper-sheet handling machine according to claim 20, wherein before the bundle of paper-sheets added with the medium provided with the identification data information are carried to the bar-code ticket handling machine, a plurality of bundles of paper-sheets, each added with the medium, are stacked one on another, such that the plurality of bundles of paper-sheets are collectively handled by the bar-code ticket handling machine, and wherein the bar-code ticket handling machine is configured to read the identification data information of each medium when the medium is carried thereto as well as to reject the medium.

22. The paper-sheet handling machine according to claim 20, wherein both the banknote handling machine and the bar-code ticket handling machine are configured to read the identification data information of the medium and to reject the medium, and wherein the discrimination information concerning the banknotes discriminated by the banknote handling machine is associated with the identification data information of the medium read by the banknote handling machine.

23. The paper-sheet handling machine according to claim 14, wherein the bar-code ticket handling machine can handle six hundred or more sheets of bar-code tickets per minute.

* * * * *